US 11,423,780 B2

(12) United States Patent
Kuwahara

(10) Patent No.: US 11,423,780 B2
(45) Date of Patent: Aug. 23, 2022

(54) TRAFFIC CONTROL SYSTEM

(71) Applicant: SUBARU CORPORATION, Tokyo (JP)

(72) Inventor: Keisuke Kuwahara, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 74 days.

(21) Appl. No.: 17/106,524

(22) Filed: Nov. 30, 2020

(65) Prior Publication Data

US 2021/0201679 A1 Jul. 1, 2021

(30) Foreign Application Priority Data

Dec. 30, 2019 (JP) .............................. JP2019-240029
Dec. 30, 2019 (JP) .............................. JP2019-240030
(Continued)

(51) Int. Cl.
*G08G 1/0967* (2006.01)
*G08G 1/01* (2006.01)
(Continued)

(52) U.S. Cl.
CPC ...... *G08G 1/096791* (2013.01); *G01C 21/3807* (2020.08); *G01C 21/3889* (2020.08);
(Continued)

(58) Field of Classification Search
CPC .......... G08G 1/096791; G08G 1/0112; G08G 1/0145; G08G 1/096725; G08G 1/096775;
(Continued)

(56) References Cited

U.S. PATENT DOCUMENTS

2011/0054716 A1   3/2011   Stahlin et al.
2017/0371349 A1  12/2017   Kim et al.
(Continued)

FOREIGN PATENT DOCUMENTS

EP   3 543 864 A1      9/2019
EP   3950453 A1  *    2/2022
(Continued)

OTHER PUBLICATIONS

Reddy et al. (On Board Assistant to GPS Navigation of Vehicles; IEEE, 2009). (Year: 2009).*
(Continued)

*Primary Examiner* — Hirdepal Singh
(74) *Attorney, Agent, or Firm* — McDermott Will & Emery LLP

(57) ABSTRACT

A traffic control system includes a vehicle control apparatus and a traffic control apparatus. The vehicle control apparatus includes a travel environment data transmission unit and a travel control unit. The traffic control apparatus includes a data supplementability determination unit and a data supplementation unit. The data supplementability determination unit determines whether or not data regarding a communication-disrupted vehicle out of a plurality of vehicles is supplementable on the basis of travel environment data received from a nearby vehicle traveling near the communication-disrupted vehicle. The data supplementation unit generates traffic environment data supplemented with the data regarding the communication-disrupted vehicle, on the basis of the travel environment data received from the nearby vehicle, and transmits the traffic environment data generated, to the nearby vehicle.

18 Claims, 15 Drawing Sheets

(30) Foreign Application Priority Data

Dec. 30, 2019 (JP) .............................. JP2019-240031
Mar. 19, 2020 (JP) .............................. JP2020-049713
Aug. 31, 2020 (JP) .............................. JP2020-145264

(51) Int. Cl.
*G01C 21/00* (2006.01)
*G01C 21/36* (2006.01)

(52) U.S. Cl.
CPC ......... *G08G 1/0112* (2013.01); *G08G 1/0145* (2013.01); *G08G 1/096725* (2013.01); *G01C 21/3691* (2013.01)

(58) Field of Classification Search
CPC ............ G01C 21/3807; G01C 21/3889; G01C 21/3691; G01C 21/3819; G01C 21/3841
USPC .......................................................... 340/902
See application file for complete search history.

(56) References Cited

U.S. PATENT DOCUMENTS

| | | |
|---|---|---|
| 2018/0299285 A1 | 10/2018 | Morita |
| 2019/0163202 A1 | 5/2019 | Hatano et al. |
| 2019/0236955 A1* | 8/2019 | Hu .................. G08G 1/096844 |
| 2020/0166945 A1 | 5/2020 | Kim et al. |
| 2020/0183389 A1 | 6/2020 | Kim et al. |
| 2020/0256681 A1 | 8/2020 | Kim et al. |
| 2021/0039671 A1* | 2/2021 | Kim .................... G01C 21/3822 |
| 2021/0407290 A1* | 12/2021 | Oba ....................... G08G 1/163 |

FOREIGN PATENT DOCUMENTS

| | | |
|---|---|---|
| JP | 2019-212095 A | 12/2019 |
| WO | 2017/111126 A1 | 6/2017 |
| WO | 2017/179209 A1 | 10/2017 |
| WO | 2019/031853 A1 | 2/2019 |

OTHER PUBLICATIONS

Extended European Search Report issued in corresponding European Patent Application No. 20217529.5-1001, dated Dec. 15, 2021.

* cited by examiner

TRAFFIC CONTROL SYSTEM

CROSS-REFERENCE TO RELATED APPLICATIONS

This application claims priority from Japanese Patent Application Nos. 2020-145264 filed on Aug. 31, 2020, 2019-240029 filed on Dec. 30, 2019, 2019-240030 filed on Dec. 30, 2019, 2019-240031 filed on Dec. 30, 2019, and 2020-049713 filed on Mar. 19, 2020, the entire contents of which are hereby incorporated by reference.

BACKGROUND

The disclosure relates to a traffic control system that generates data related to traffic environment on the basis of data received from a plurality of vehicles.

Traffic data service systems provide vehicles traveling on roads, e.g., automobiles, with data related to traffic situations. In recent years, development has been promoted of road traffic systems such as ITS (Intelligent Transport System).

Moreover, vehicles have adopted techniques of recognizing frontward travel environment by, for example, a camera and radar, to make a travel control on the basis of the travel environment thus recognized. Using both the data received from the traffic information service systems and travel environment data autonomously recognized contributes to a higher level of travel safety.

For example, International Publication WO2017/179209 discloses a technique including detecting conditions of the surroundings of an own vehicle, extracting environment data that causes a change in a driver assistance control, and transmitting the environment data to an external apparatus. The external apparatus receives environment data from a plurality of vehicles. The technique also includes making a request of the external apparatus for environment data regarding a road on which the own vehicle is traveling, and changing a control plan for the driver assistance control on the basis of the environment data transmitted from the external apparatus as a response to the request.

SUMMARY

An aspect of the technology provides a traffic control system including a vehicle control apparatus and a traffic control apparatus. The vehicle control apparatus is configured to transmit travel environment data regarding an own vehicle. The traffic control apparatus is configured to receive the travel environment data from the vehicle control apparatus of each of a plurality of vehicles, and transmit, to each of the plurality of vehicles, traffic environment data based on the travel environment data received. The vehicle control apparatus includes a travel environment data transmission unit and a travel control unit. The travel environment data transmission unit is configured to transmit the travel environment data to the traffic control apparatus. The travel environment data includes travel data and appearance data regarding the own vehicle, and detection data regarding exterior environment around the own vehicle. The detection data includes appearance data regarding a surrounding vehicle. The travel control unit is configured to control travel of the own vehicle on the basis of the traffic environment data received from the traffic control apparatus, the travel environment data regarding the own vehicle, or both. The traffic control apparatus includes a data supplementability determination unit and a data supplementation unit. The data supplementability determination unit is configured to determine whether or not data regarding a communication-disrupted vehicle out of the plurality of the vehicles is supplementable on the basis of the travel environment data received from a nearby vehicle traveling near the communication-disrupted vehicle. The communication-disrupted vehicle has disruption of communication. The data supplementation unit is configured to generate, on the condition that the data supplementability determination unit determines that the data regarding the communication-disrupted vehicle is supplementable, the traffic environment data supplemented with the data regarding the communication-disrupted vehicle, on the basis of the travel environment data received from the nearby vehicle, and transmit the traffic environment data generated, to the nearby vehicle.

An aspect of the technology provides a traffic control system including a vehicle control apparatus and a traffic control apparatus. The vehicle control apparatus is configured to transmit travel environment data regarding an own vehicle. The traffic control apparatus is configured to receive the travel environment data from the vehicle control apparatus of each of a plurality of vehicles, and transmit, to each of the plurality of the vehicles, traffic environment data based on the travel environment data received. The vehicle control apparatus includes first circuitry. The first circuitry is configured to transmit the travel environment data to the traffic control apparatus. The travel environment data includes travel data and appearance data regarding the own vehicle, and detection data regarding exterior environment around the own vehicle. The detection data includes appearance data regarding a surrounding vehicle. The first circuitry is configured to control travel of the own vehicle on the basis of the traffic environment data received from the traffic control apparatus, the travel environment data regarding the own vehicle, or both. The traffic control apparatus includes second circuitry. The second circuitry is configured to determine whether or not data regarding a communication-disrupted vehicle out of the plurality of the vehicles is supplementable on the basis of the travel environment data received from a nearby vehicle traveling near the communication-disrupted vehicle. The communication-disrupted vehicle has disruption of communication. The second circuitry is configured to generate, on the condition that the second circuitry determines that the data regarding the communication-disrupted vehicle is supplementable, the traffic environment data supplemented with the data regarding the communication-disrupted vehicle, on the basis of the travel environment data received from the nearby vehicle, and transmit the traffic environment data generated, to the nearby vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
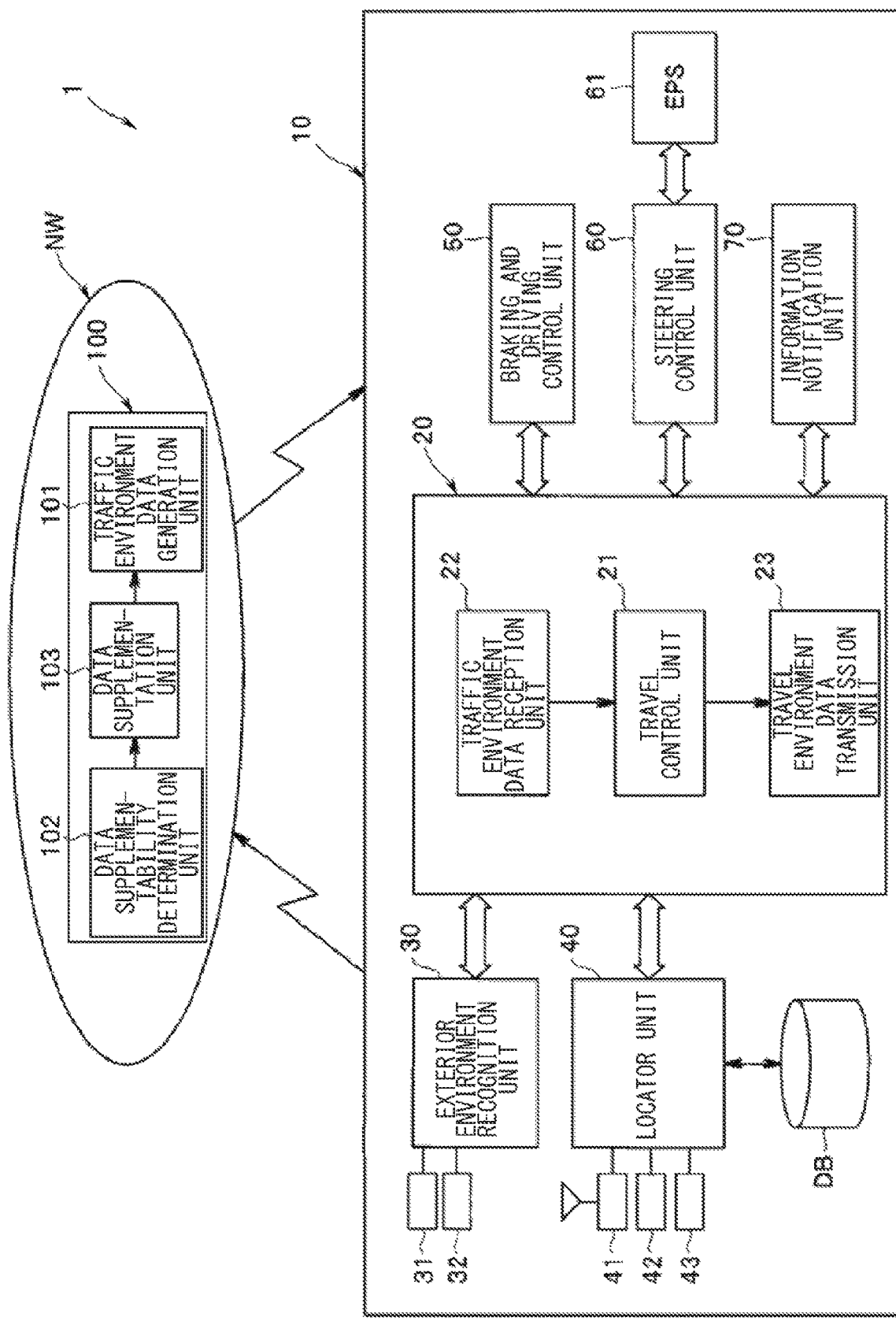
FIG. 1 is an overall configuration diagram of a traffic control system, according to a first embodiment.

In existing traffic data service systems, a plurality of vehicles transmit data to an external apparatus. If any vehicle has disruption of communication with the external apparatus because of, for example, communication failure, there occurs deficiency in data to be transmitted from the external apparatus to each vehicle. This may contribute to lowered reliability in the data to be transmitted from the external apparatus to each vehicle, causing possibility of interference with control on vehicle side, inhibiting a stable traffic flow.

It is desirable to provide a traffic control system that makes it possible to maintain a stable traffic flow, in collecting data from a plurality of vehicles to transmit data related to traffic environment to each vehicle, even if any one of the vehicles has disruption of communication.

In the following, some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

A first embodiment of the disclosure is described below with reference to the drawings. FIG. 1 illustrates an overall configuration of a traffic control system according to the first embodiment. As illustrated in FIG. 1, the traffic control system 1 in this embodiment may include vehicle control apparatuses 10 and a traffic control apparatus 100. The vehicle control apparatuses 10 may be provided in respective ones of a plurality of vehicles. The traffic control apparatus 100 may be provided in a network environment NW to which the vehicle control apparatuses 10 are coupled by wireless communication. The traffic control apparatus 100 may include, for example, a server apparatus in a network environment by cloud computing or edge computing, or a network environment by a road ancillary equipment network.

In this embodiment, the vehicle control apparatus 10 may include, as a main unit, an automated driving controller 20. The automated driving controller 20 may control travel of a vehicle by automated driving that involves no driving operations by an occupant of the vehicle. To the automated driving controller 20, for example, an exterior environment recognition unit 30, a locator unit 40, a braking and driving control unit 50, a steering control unit 60, and an information notification unit 70 may be coupled, allowing them to communicate with one another through an in-vehicle network.

The exterior environment recognition unit 30 may include various devices for environment recognition, e.g., a camera unit 31 and a radar device 32. In one embodiment of the disclosure, the camera unit 31 and the radar device 32 may serve as an "autonomous sensor". The camera unit 31 may include, for example, a stereo camera or a monocular camera. The radar device 32 may include, for example, millimeter wave radar or laser radar. The exterior environment recognition unit 30 may recognize exterior environment around an own vehicle on the basis of, for example, detection data regarding objects around the own vehicle, traffic data, and positional data regarding the own vehicle. The detection data may be detected by, for example, the camera unit 31 and the radar device 32. The traffic data may be acquired by infrastructural communication such as road-to-vehicle communication and vehicle-to-vehicle communication. Positioning of the positional data regarding the own vehicle may be carried out by the locator unit 40.

The locator unit 40 may detect a vehicle position of the own vehicle, mainly on the basis of positioning based on signals from a plurality of navigation satellites such as GNSS (Global Navigation Satellite System) satellites. In a case with lowered positioning accuracy affected by, for example, a capture state of the signal, i.e., radio waves, from the satellites, or multiple paths caused by reflection of the radio waves, the locator unit 40 may detect the vehicle position of the own vehicle, with the combined use of positioning by autonomous navigation using an on-vehicle sensor such as a gyro sensor 42 and a vehicle speed sensor 43.

The positioning by the plurality of the navigation satellites may include receiving, through a receiver 41, a signal including data regarding, for example, an orbit and time transmitted from the navigation satellites, and positioning, on the basis of the received signal, a self-position of the own vehicle as an absolute position including longitude, latitude, altitude, and time data. In addition, the positioning by the autonomous navigation may include positioning an own-vehicle position as a relative positional change, on the basis of a forwarding azimuth of the own vehicle and a distance of movement of the own vehicle. The forwarding azimuth of the own vehicle may be detected by the gyro sensor 42. The distance of movement of the own vehicle may be calculated from, for example, a vehicle speed pulse to be outputted from the vehicle speed sensor 43.

The locator unit 40 may include a map database DB, and specify a position on map data of the map database DB from the positional data regarding the own vehicle obtained by the positioning. The map database DB may be a database that holds a high-precision map created for a travel control including the automated driving. The map database DB may be held in a large-capacity storage medium such as an HDD (hard disk drive) or an SSD (solid state drive).

In one example, the high-precision map may be configured as a multi-dimensional map, i.e., a dynamic map, that holds, in a plurality of hierarchies, static data such as road shapes and relation of connection of roads, and dynamic data such as traffic data to be collected by the infrastructure communication. Road data may include, for example, types of lane lines of roads, the number of traveling lanes, a width of a traveling lane, point column data indicating a widthwise center position of the traveling lane, a curvature of the traveling lane, a forwarding azimuth angle of the traveling lane, and speed limitation. The road data may be held together with attribute data such as reliability of the data and a date of an update of the data.

Moreover, the locator unit 40 may carry out maintenance and management of the map database DB, and test nodes, links, and data points of the map database DB, to keep them up to date. The locator unit 40 may also create new data for a region devoid of data on the map database DB, and add the new data to the map database DB, to build a more detailed database. Updating the data of the map database DB and adding the new data to the map database DB may be carried out by comparing the positional data obtained by the positioning, to the data held in the map database DB.

The braking and driving control unit 50 may control a traveling driving force to be generated by an electric motor or an internal combustion engine. The braking and driving control unit 50 may also control, for example, a traveling speed of the own vehicle, switching between advance and reverse movements, and braking. For example, the braking and driving control unit 50 may control an operating state of an engine on the basis of signals from various sensors that detect the operating state of the engine and various control data to be acquired through an in-vehicle network. Moreover, the braking and driving control unit 50 may also control unillustrated brake devices for four wheels independently of a brake operation by an occupant, or a driver, on the basis of a brake switch, wheel speeds of the four wheels, a steering angle, a yaw rate, and other pieces of vehicle data. Furthermore, the braking and driving control unit 50 may calculate brake fluid pressure of each wheel on the basis of a brake force of the relevant wheel, to make, for example, an anti-lock brake control and a sideslip prevention control.

The steering control unit 60 may control steering torque by an electric power steering (EPS) unit 61 provided in a steering system, on the basis of, for example, the vehicle speed, the driver's steering torque, the steering angle, the yaw rate, and other pieces of the vehicle data. The control of the steering torque may be executed as a current control on the electric motor by the EPS unit 61. The EPS unit 61 may provide target steering torque that brings an actual steering angle to a target steering angle. The EPS unit 61 may assume the target steering torque to be an instructed torque, and control a driving current of the electric motor corresponding to the instructed torque, by, for example, a PID (proportional-integral-differential) control.

The information notification unit 70 may make an alarm control to call the driver's attention in a case with an abnormality in various devices of the vehicle, and make an output control of various pieces of information to be presented to the driver. For example, the information notification unit 70 may give notification of an alarm and control data, with the use of a visual output, an auditory output, or both. The visual output may be provided by, for example, a monitor, a display, an alarm lamp, or any combination thereof. The auditory output may be provided by, for example, a speaker, a buzzer, or both. During execution of the travel control including the automated driving, the information notification unit 70 may provide the driver with a control state of the travel control. In a case where the travel control including the automated driving is stopped by an operation by the driver, the information notification unit 70 may inform the driver of a driving state at the time of the stop.

Description is given next of the automated driving controller 20 as the main unit of the vehicle control apparatus 10. In a case where the driver operates, for example, an unillustrated switch or panel, to select a driver assistance mode or an automated driving mode instead of a manual driving mode, the automated driving controller 20 may make the travel control through the braking and driving control unit 50 and the steering control unit 60, on the basis of the data from the exterior environment recognition unit 30 and the locator unit 40. The manual driving mode is a mode in which the driver makes driving operations such as steering, acceleration, deceleration, and braking, to allow the own vehicle to travel. The driver assistance mode includes assisting the driver with driving. The automated driving mode involves no driving operation by the driver.

It is to be noted that in this embodiment, the driver assistance mode means a driving mode that includes making automatically an acceleration and deceleration control, a steering control, or both, while making the driver keeping on holding or turning a steering wheel. The driver assistance mode is assumed to include partial automated driving.

The automated driving mode means a driving mode that assumes hands-off driving in which the driver does not touch the steering wheel. That is, the automated driving mode is a conditional automated driving mode that includes making automatically the acceleration and deceleration control and the steering control, in a designed operation range in which an automated driving function operates normally. The automated driving mode may be canceled, in a case where, for example, the driver makes an override operation, e.g., holding the steering wheel, or making steering with steering torque greater than a set value, stepping on a brake pedal, and stepping on an accelerator pedal. In the automated driving mode, in a case where continuation of operation by the system is difficult, the automated driving may be canceled, and the control may be left to the manual driving by the driver.

During the travel control by the automated driving, the automated driving controller 20 may transmit, on a regular basis, data regarding travel environment of the own vehicle to the traffic control apparatus 100, and receive data regarding traffic environment around the own vehicle from the traffic control apparatus 100. In one embodiment of the disclosure, the data regarding the travel environment may serve as "travel environment data". In one embodiment of the disclosure, the data regarding the travel environment may serve as "traffic environment data". Thus, the automated driving controller 20 may include a travel control unit 21, a traffic environment data reception unit 22, and a travel environment data transmission unit 23. The travel control unit 21 may mainly control the travel of the own vehicle by the automated driving. The traffic environment data reception unit 22 may receive the traffic environment data from the traffic control apparatus 100. The travel environment data transmission unit 23 may transmit the travel environment data regarding the own vehicle to the traffic control apparatus 100.

In a case where an occupant, or a driver, turns on the automated driving mode, to input data regarding a destination or a transit point, or to directly specify such data on the map displayed on, for example, a panel, the travel control unit 21 may set, through the locator unit 40, position coordinates, e.g., a latitude and a longitude, of a traveling route. The data regarding the destination or the transit point may include, for example, a facility name, an address, and telephone numbers. It is to be noted that for example, on a motorway, turning on the automated driving mode while the vehicle is traveling on a main lane may cause the travel control unit 21 to specify a road to be traveled and a traveling lane, without specifying the destination and the traveling route.

The travel control unit 21 may calculate, by the map data and the on-vehicle sensor such as the camera unit 31, the widthwise center position of the traveling lane of the specified road. The travel control unit 21 may set, as a target route of the automated driving, a locus in a forwarding direction of the center position of the traveling lane. The same applies to a case where no destination and no traveling route are specified. In such a case, the locus in the forwarding direction of the center position of the traveling lane may be set as the target route of the automated driving.

Moreover, the travel control unit 21 may set the vehicle speed set by the driver or the speed limitation of the road, as a target vehicle speed of the automated driving, and causes the own vehicle to travel automatically to the destination along the target route, while adjusting, as appropriate, the target vehicle speed in accordance with, for example, a curvature of the traveling route, the type and a gradient of the road, and distances between the own vehicle and surrounding vehicles. In the case where no destination or no traveling route are specified, the travel control unit 21 may cause the own vehicle to travel following the center position of the traveling lane.

Furthermore, the travel control unit 21 may detect travel data on the basis of the data from the exterior environment recognizing unit 30, the locator unit 40, and the on-vehicle sensor. The travel data may include, for example, the position of the own vehicle in a lateral direction, i.e., a lateral position, with the target route as a reference, a yaw angle of the forwarding direction of the own vehicle with respect to the target route, and the vehicle speed. The target route may be the central position of the traveling lane. Thus, the travel control unit 21 may execute the steering control to follow the target route, through the steering control unit 60 and the EPS unit 61, and execute the acceleration and deceleration control toward the target speed, through the braking and driving control unit 50.

At this occasion, the travel control unit 21 may receive the traffic environment data from the traffic control apparatus 100 through the traffic environment data reception unit 22. From the traffic environment data received, the travel control unit 21 may acquire data regarding, for example, a traveling state of a surrounding vehicle. Such data regarding the traveling state of the surrounding vehicle is difficult to detect autonomously by, for example, the exterior environment recognition unit 30 and the locator unit 40 of the own vehicle. Thus, the travel control unit 21 may control the travel of the own vehicle on the basis of the travel environment data regarding the own vehicle, the traffic environment data received from the traffic control apparatus 100, or both.

The travel environment data regarding the own vehicle may be data including the travel data and appearance data regarding the own vehicle, and the detection data regarding the exterior environment around the own vehicle. Such detection data may include appearance data regarding a surrounding vehicle. The travel environment data may be transmitted from the travel environment data transmission unit 23 to the traffic control apparatus 100 outside the own vehicle. As described later, the traffic control apparatus 100 may collect the travel environment data from a plurality of vehicles, generate the traffic environment data related to the traffic environment of the plurality of the vehicles on the basis of the collected travel environment data, and transmit the traffic environment information to each of the vehicles.

As the travel data regarding the own vehicle, the travel environment data transmission unit 23 may transmit, for example, a coordinate position of the own vehicle on the map, the lateral position in the traveling lane, the traveling speed, and an acceleration or deceleration rate. As the appearance data regarding the own vehicle, the travel environment data transmission unit 23 may transmit, for example, data such as a vehicle body color, e.g., a paint color, and a vehicle type of the own vehicle, e.g., an ordinary vehicle, a truck, a special vehicle, and a motorcycle. The appearance data regarding the own vehicle may be held in advance in a memory in the automated driving controller 20.

As the detection data regarding the exterior environment around the own vehicle, the travel environment data transmission unit 23 may transmit the travel data regarding a surrounding vehicle such as a preceding vehicle ahead of the own vehicle and a vehicle on an adjacent lane, and the appearance data regarding the surrounding vehicle. The surrounding vehicle may be detected by the exterior environment recognition unit 30. The travel data regarding the surrounding vehicle may include, for example, a position of the surrounding vehicle with the own-vehicle position as a reference, a relative speed of the preceding vehicle to the own vehicle, the traveling lane on which the preceding vehicle is traveling, and an acceleration or deceleration rate of the preceding vehicle. The appearance data regarding the surrounding vehicle may include the vehicle body color and the vehicle type of the surrounding vehicle. The vehicle body color and the vehicle type of the surrounding vehicle may be recognized on the basis of data from, for example, the camera unit 31 and the radar device 32 of the exterior environment recognition unit 30.

The traffic control apparatus 100 receives the travel environment data for each of the vehicles. The travel environment data for each of the vehicles is transmitted from the vehicle control apparatus 10 of the relevant one of the vehicles. The traffic control apparatus 100 may generate the traffic environment data, and transmit the resultant data to each of the vehicles. At this occasion, if any of the vehicles has disruption of communication between the vehicle control apparatus 10 and the traffic control apparatus 100, the traffic environment data to be transmitted to each of the vehicles lacks the data regarding the vehicle having the disruption of communication, or a communication-disrupted vehicle. This may cause possibility of inhibition of a smooth traffic flow.

Even in the case with such disruption of communication, the traffic control apparatus 100 supplements the data regarding the communication-disrupted vehicle on the basis of the data from a nearby vehicle around the communication-disrupted vehicle. Hence, it is possible to maintain the smooth traffic flow. Thus, the traffic control apparatus 100 may include a traffic environment data generation unit 101, a data supplementability determination unit 102, and a data supplementation unit 103.

The traffic environment data generation unit 101 may generate, on the basis of the travel environment data collected from a plurality of vehicles, the traffic environment data regarding the surroundings of the plurality of the vehicles on a road, and transmit the resultant data to each of the plurality of the vehicles. The traffic environment data may mainly include data regarding a moving object and a stationary object that are present on a road within a predetermined range and registered in virtual space. The traffic environment data may further include data regarding, for example, traffic regulations due to accidents, traffic congestion, and construction work, and warning because of weather conditions such as rainfall and snow. For example, the data regarding the moving object on the road to be included in the traffic environment data may include the position of each vehicle, i.e., the coordinate position on the map, a speed of each vehicle on each traveling lane, a distance between any two vehicles on each traveling lane, the lateral position and lateral movement speed of each vehicle on the traveling lane, and the vehicle body color and the vehicle type of each vehicle.

In a case where any one of the plurality of the vehicles has the disruption of communication, that is, in a case with any communication-disrupted vehicle, the data supplementability determination unit 102 may determine whether or not the data regarding the communication-disrupted vehicle is supplementable on the basis of the data from a vehicle devoid of disruption of communication near the communication-disrupted vehicle, i.e., a communicatable vehicle.

For example, the data supplementability determination unit 102 may compare the travel environment data received last from the communication-disrupted vehicle, or received before the disruption of communication, to the travel environment data received from the communicatable vehicle nearby after the disruption of communication. The data supplementability determination unit 102 may determine that the data regarding the communication-disrupted vehicle is supplementable in a case where both pieces of the travel environment data match under the following conditions (i) to (v). It is to be noted that description is made by giving an example where the communicatable vehicle near the communication-disrupted vehicle is a vehicle traveling behind the communication-disrupted vehicle. However, this is non-limiting. The communicatable vehicle is not limited to the vehicle traveling behind the communication-disrupted vehicle, but may be any vehicle configured to detect the communication-disrupted vehicle by the on-vehicle sensor such as the camera unit 31 and the radar device 32.

(i) Vehicle Position

The data supplementability determination unit 102 may compare the vehicle position of the communication-disrupted vehicle itself received last from the communication-disrupted vehicle, to a position of a preceding vehicle. The position of the preceding vehicle may be calculated as follows. The communicatable vehicle traveling behind the communication-disrupted vehicle detects the communication-disrupted vehicle as a preceding vehicle, and calculates the position of the preceding vehicle with the communicatable vehicle as a reference. The data supplementability determination unit 102 may check whether or not a condition is satisfied that a difference between the positions is equal to or smaller than a set value, e.g., several meters or less. In a case where the difference between the positions is equal to or smaller than the set value, the data supplementability determination unit 102 may determine that the preceding vehicle detected by the communicatable vehicle is highly likely to match the communication-disrupted vehicle.

(ii) Vehicle Speed

The data supplementability determination unit 102 may compare the relative speed of the preceding vehicle received from the communicatable vehicle traveling behind the communication-disrupted vehicle, to the relative speed to the relevant communicatable vehicle calculated from the vehicle speed of the communication-disrupted vehicle itself received last from the communication-disrupted vehicle. The data supplementability determination unit 102 may check whether or not a condition is satisfied that a difference between the relative speeds is equal to or smaller than a set value, e.g., several kilometers per hour (km/h) or less. In a case where the difference between the relative speeds is equal to or smaller than the set value, the data supplementability determination unit 102 may determine that the preceding vehicle detected by the communicatable vehicle is highly likely to match the communication-disrupted vehicle.

(iii) Vehicle Body Color

The data supplementability determination unit 102 may compare the vehicle body color of the preceding vehicle received from the communicatable vehicle traveling behind the communication-disrupted vehicle, to the vehicle body color of the communication-disrupted vehicle itself received last from the communication-disrupted vehicle. The data supplementability determination unit 102 may check whether or not a condition is satisfied that the vehicle body colors are identical. In a case where the vehicle body colors are identical, the data supplementability determination unit 102 may determine that the preceding vehicle detected by the communicatable vehicle is highly likely to match the communication-disrupted vehicle.

(iv) Vehicle Type

The data supplementability determination unit 102 may compare the vehicle type of the preceding vehicle received from the communicatable vehicle traveling behind the communication-disrupted vehicle, to the vehicle type of the communication-disrupted vehicle itself received last from the communication-disrupted vehicle. The data supplementability determination unit 102 may check whether or not a condition is satisfied that the vehicle types are identical. In a case where the vehicle types are identical, the data supplementability determination unit 102 may determine that the preceding vehicle detected by the communicatable vehicle is highly likely to match the communication-disrupted vehicle.

(v) Traveling Lane

The data supplementability determination unit 102 may compare the traveling lane of the preceding vehicle received from the communicatable vehicle traveling behind the communication-disrupted vehicle, to the traveling lane of the communication-disrupted vehicle itself received last from the communication-disrupted vehicle. The data supplementability determination unit 102 may check whether or not a condition is satisfied that the traveling lanes are identical. In a case where the traveling lanes are identical, the data supplementability determination unit 102 may determine that the preceding vehicle detected by the communication vehicle is likely to match the communication-disrupted vehicle.

In a case where the forgoing conditions (i) to (v) are satisfied, the data supplementability determination unit 102 may determine that the data regarding the communication-disrupted vehicle is supplementable with the travel environment data received from the communicatable vehicle. Receiving a result of the determination of supplementability from the data supplementability determination unit 102, the data supplementation unit 103 may generate supplementation data. It is to be noted that while the forgoing conditions (i) to (v) are not necessarily satisfied, the data regarding the communication-disrupted vehicle may be determined to be non-supplementable until all of the forgoing conditions (i) to (v) are satisfied. In this case, even if supplementation of the data regarding the communication-disrupted vehicle is in progress, when a determination is made, on the basis of the lateral position and a lateral movement speed of the communication-disrupted vehicle on the target traveling lane, that the communication-disrupted vehicle has made a lane change and moved out of the target traveling lane, or that the communication-disrupted vehicle has moved out of a detection range of the nearby vehicle, the communication-disrupted vehicle may be excluded from a target of the supplementation.

In the case where the data supplementability determination unit 102 has made the determination that the data regarding the communication-disrupted vehicle is supplementable, the data supplementation unit 103 may generate, on the basis of the travel environment data transmitted from the communicatable vehicle, data such as the position, the speed, the traveling lane, the vehicle body color, and the vehicle type of the communication-disrupted vehicle. The data supplementation unit 103 may register the resultant data in the virtual space. The supplementary data may be maintained and updated on cycles from the reception of the travel environment data from the communicatable vehicle to the reception of subsequent data. At the same time, status data regarding the relevant vehicle in the virtual space may be generated that indicates "communication disrupted" and "data supplementation in progress".

Figure 2:
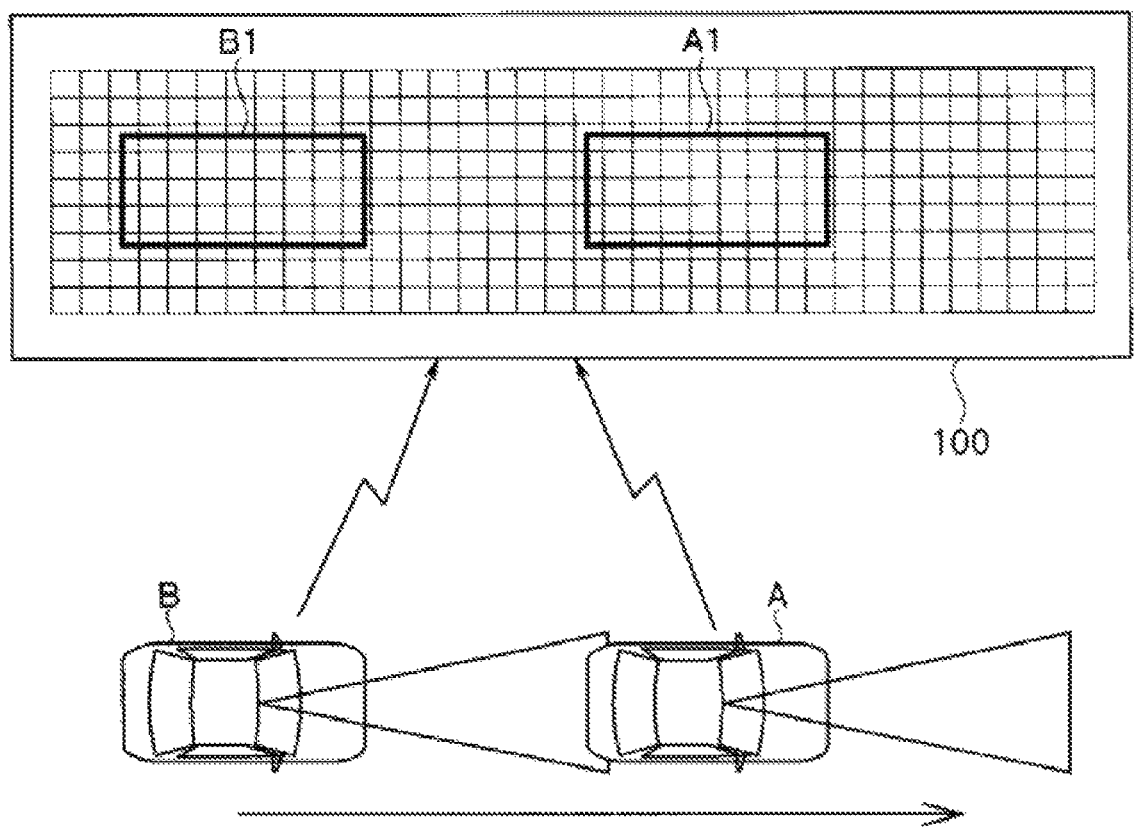
FIG. 2 illustrates registration of vehicles in virtual space, according to the first embodiment.
Figure 3:
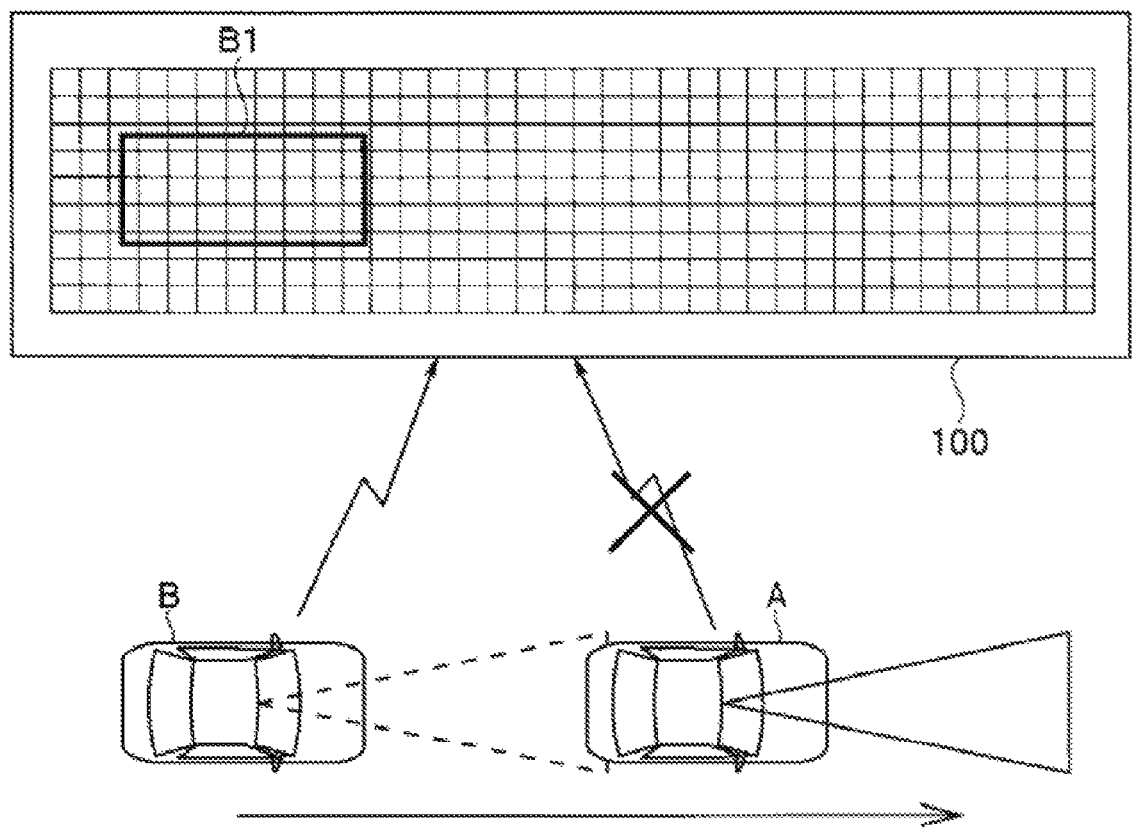
FIG. 3 illustrates a first example of the virtual space deficient in a communication-disrupted vehicle, according to the first embodiment.
Figure 4:
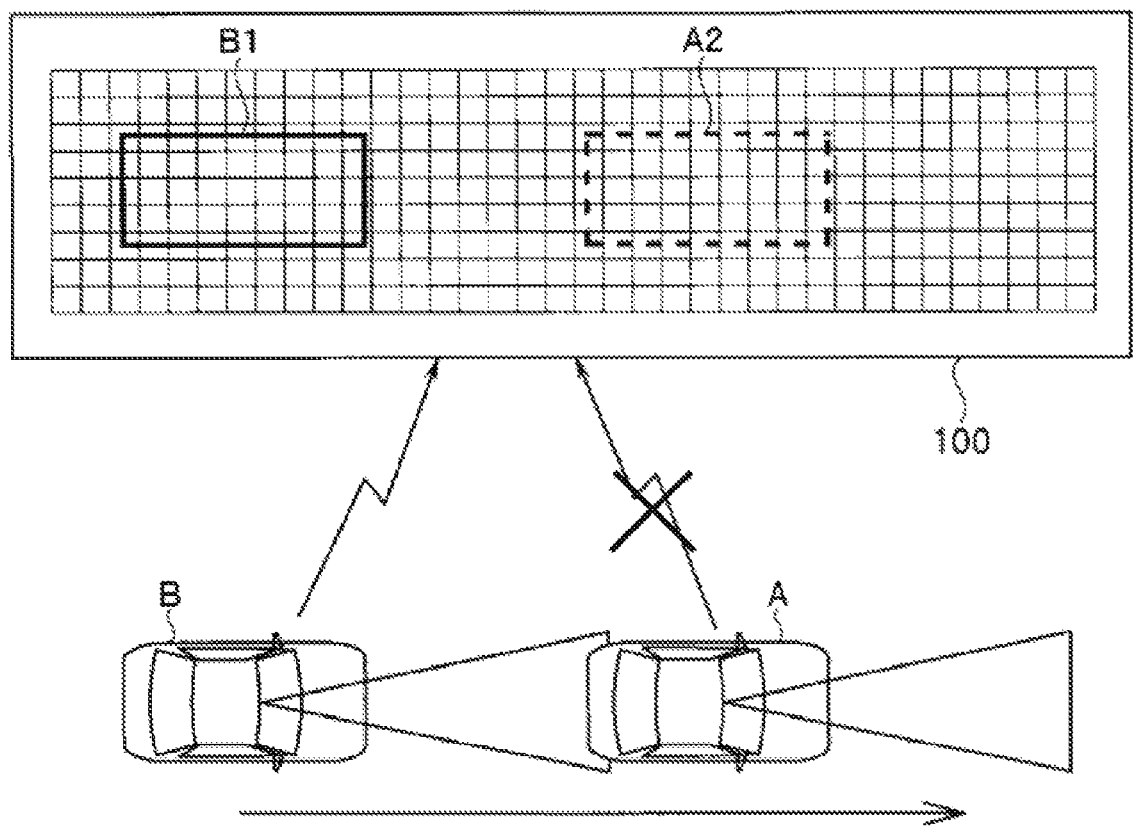
FIG. 4 illustrates a first example of the virtual space supplemented with the communication-disrupted vehicle, according to the first embodiment.
Figure 5:
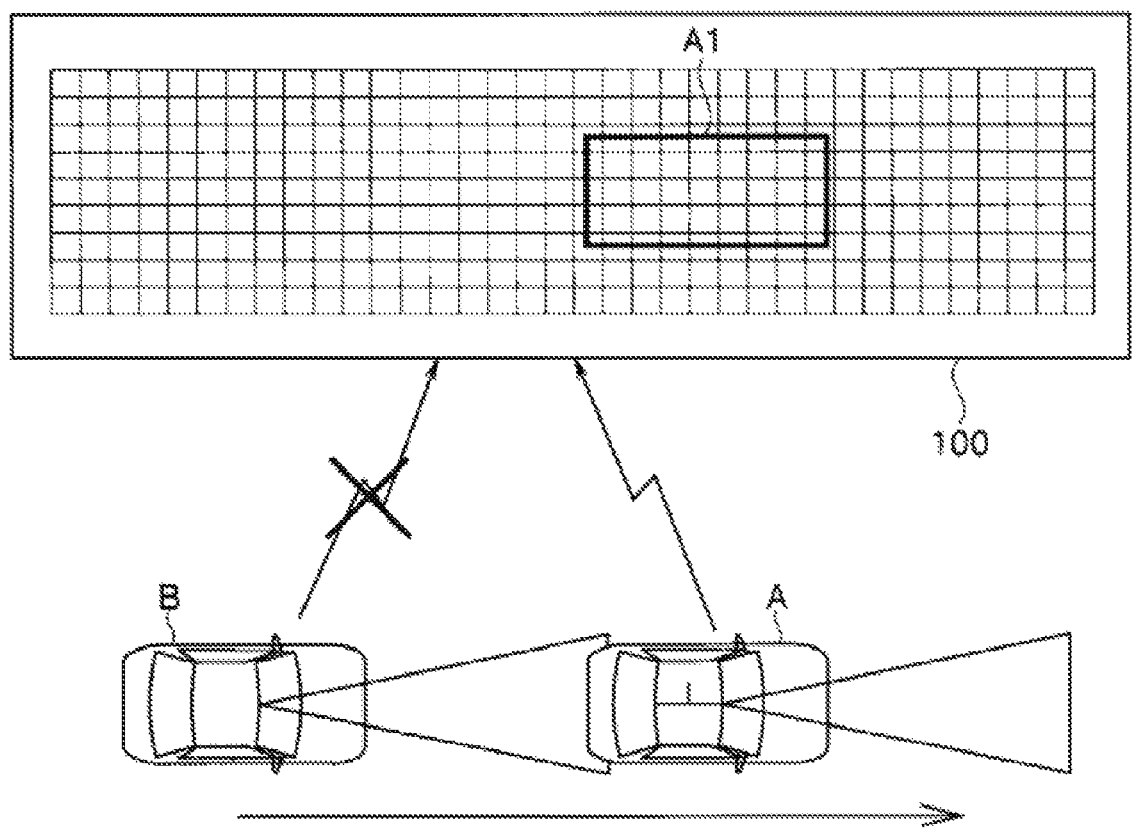
FIG. 5 illustrates a second example of the virtual space deficient in the communication-disrupted vehicle, according to the first embodiment.
Figure 6:
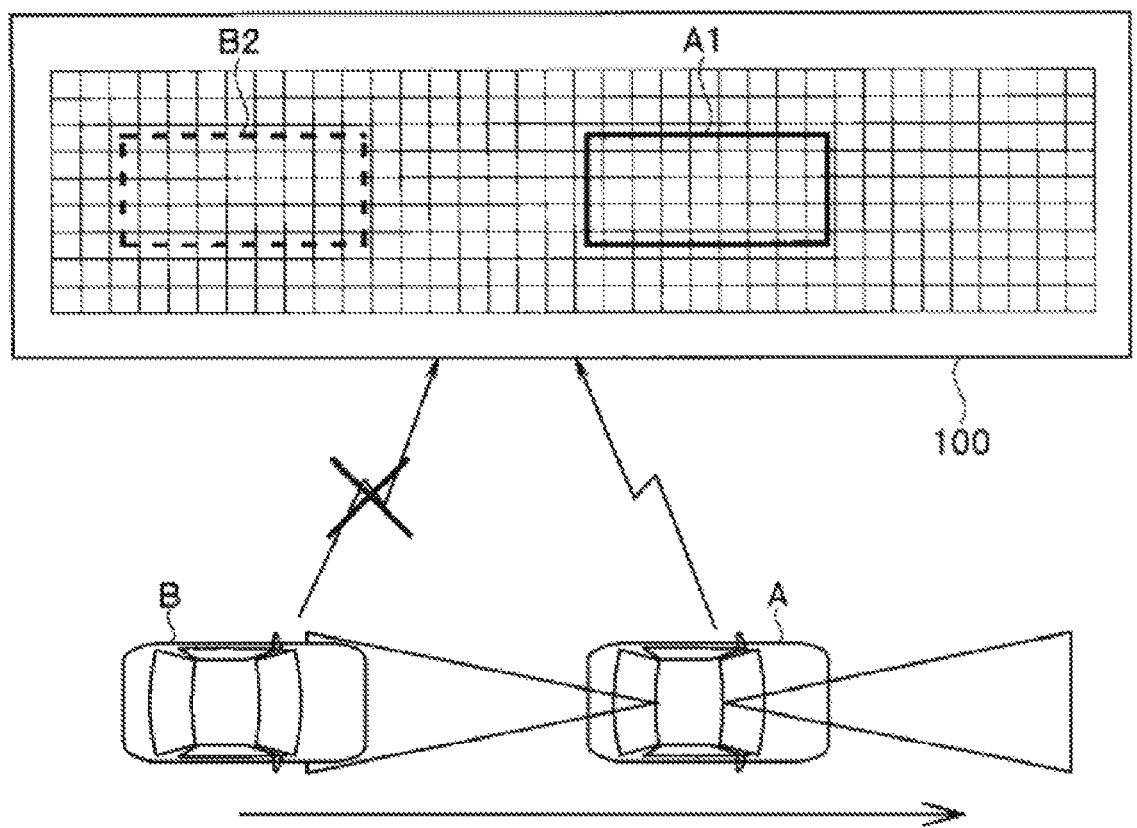
FIG. 6 illustrates a second example of the virtual space supplemented with the communication-disrupted vehicle, according to the first embodiment.

FIG. 2 illustrates registration of vehicles in the virtual space. For example, in real space, a vehicle A and a vehicle B traveling behind the vehicle A are present, and communication is normally established between the vehicles A and B, and the traffic control apparatus 100. In this case, the traffic control apparatus 100 may register the vehicles A and B in the real space, respectively as vehicles A1 and B1 in the virtual space. Described here is a case where a communication failure occurs in the vehicle A or B, causing disruption of the communication between the vehicle A or the vehicle B, and the traffic control apparatus 100. FIG. 3 illustrates a first example of the virtual space deficient in a communication-disrupted vehicle. FIG. 4 illustrates a first example of the virtual space supplemented with the communication-disrupted vehicle, giving an example where the communication failure occurs in the vehicle A. FIG. 5 illustrates a second example of the virtual space deficient in the communication-disrupted vehicle. FIG. 6 illustrates a second example of the virtual space supplemented with the communication-disrupted vehicle, giving an example where the communication failure occurs in the vehicle B.

In the case where the communication failure occurs in the vehicle A and the data regarding the vehicle A is non-supplementable, as illustrated in FIG. 3, while the vehicles A and B are in the real space, only the vehicle B1 is in the virtual space, with deficiency in the vehicle A1. In contrast, in a case where the data regarding the vehicle A is supplemented, as illustrated in FIG. 4, a vehicle A2 and the vehicle B1 are in the virtual space, with the vehicle A1 replaced with the vehicle A2. The vehicle A2 is obtained by re-registering the vehicle A1 as the vehicle A2 on the basis of the supplementary data regarding the vehicle A detected by the vehicle B in the real space. The status data is changed from "normal communication" to "communication disrupted" and "data supplementation in progress".

In the case where the communication failure occurs in the vehicle B, and the vehicle A fails in detecting the vehicle B behind, the data regarding the vehicle B is left non-supplemented. As illustrated in FIG. 5, while the vehicles A and B are in the real space, only the vehicle A1 is in the virtual space, with deficiency in the vehicle B1. In contrast, in a case where the vehicle A detects the vehicle B behind by the on-vehicle sensor, and the data regarding the vehicle A is supplementable, as illustrated in FIG. 6, the vehicles A1 and B2 are in the virtual space, with the vehicle B1 replaced with the vehicle B2. The vehicle B2 is obtained by re-registering the vehicle B1 as the vehicle B2 on the basis of the supplementary data based on the data regarding the vehicle B detected by the vehicle A in the real space. The status data is changed from "normal communication" to "communication disrupted" and "data supplementation in progress".

As described above, supplementing the data regarding the communication-disrupted vehicle with the supplementary data regarding the communication-disrupted vehicle registered in the virtual space makes it possible for the vehicles other than the communication-disrupted vehicle to acquire, from the traffic control apparatus 100, the traffic environment data similar to that in a case without the communication failure. In this case, the status data makes it possible for each of the vehicles to determine which vehicle has its data supplemented with the supplementary data. Hence, it is possible to appropriately distinguish the travel environment data acquired autonomously and the traffic environment data from the traffic control apparatus 100, making it possible to make the travel control with enhanced safety and smoothness.

Figure 7:
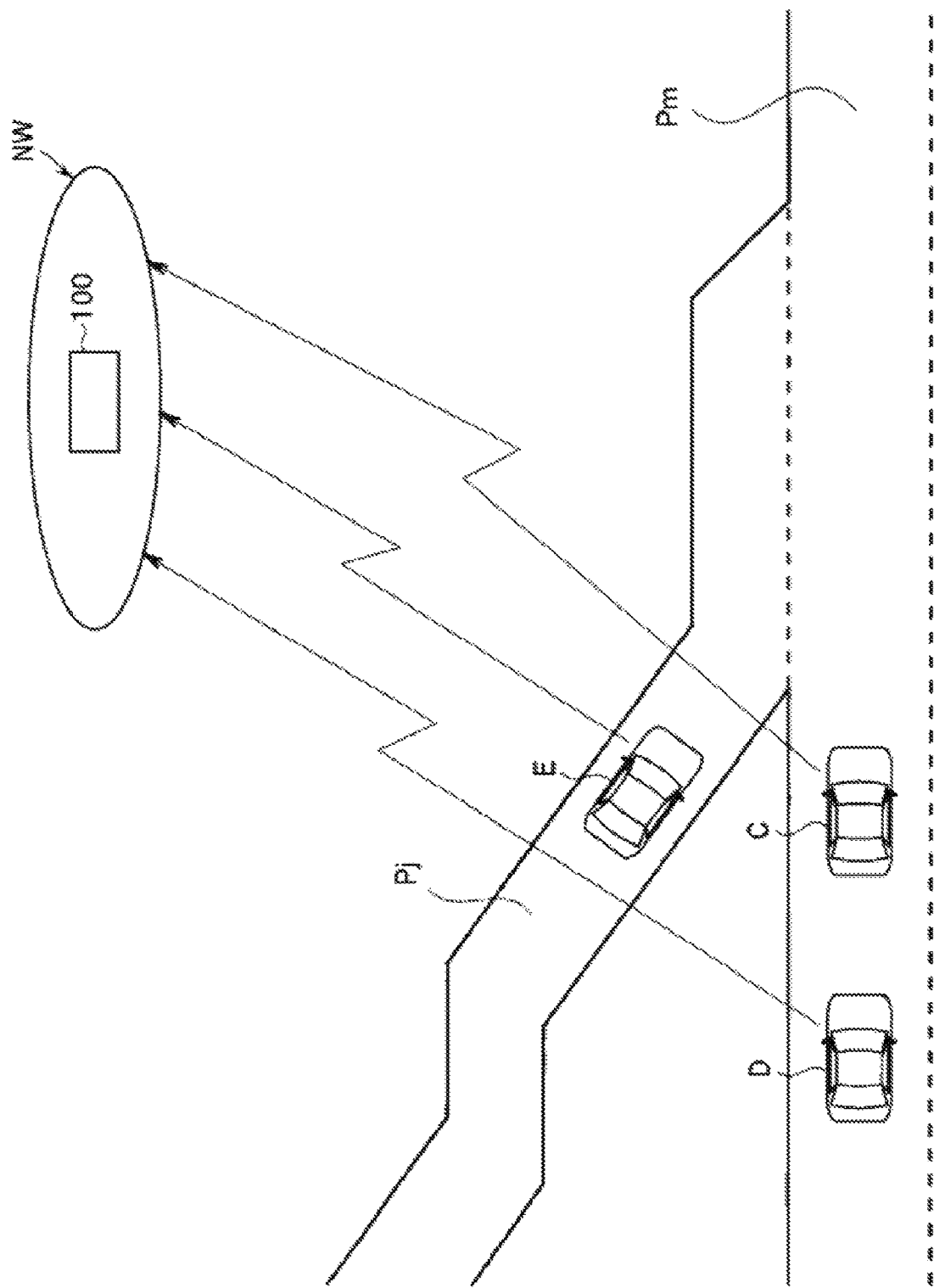
FIG. 7 illustrates a traffic situation around a lane merging point, according to the first embodiment.

FIG. 7 illustrates a traffic situation around a lane merging point. FIG. 7 illustrates a situation that a vehicle C and a subsequent vehicle D are traveling on a main lane Pm, while a vehicle E is traveling on a merging lane Pj joining the main lane Pm. In a case where communication between the traffic control apparatus 100 and the vehicles C, D, and E is normal, the vehicle C on the main lane Pm and the vehicle E on the merging lane Pj control their travel with respect to each other on the basis of the traffic environment data from the traffic control apparatus 100. This leads to smooth merging.

Let us assume a case where a communication failure occurs in the vehicle C, causing disruption of the communication with the traffic control apparatus 100, and the traffic control apparatus 100 finds data regarding the vehicle C non-supplementable on the basis of data regarding the vehicle D. In this case, the vehicle E attempting to enter the main lane Pm may fail in recognizing the vehicle C forwarding near the merging point. Accordingly, the vehicle E may possibly enter the merging point without deceleration, assuming that there is time left before the vehicle D comes close to the merging point. This result in abrupt deceleration of the vehicle C, the vehicle E, or both, upon recognizing the others by the on-vehicle sensor.

In contrast, in a case where the vehicle D transmits the data regarding the vehicle C to the traffic control apparatus 100, and the traffic control apparatus 100 supplements the data regarding the vehicle D to transmit the resultant data to the vehicle E, it is possible for the vehicle E to recognize the vehicle C forwarding near the merging point, recognize the vehicle D forwarding behind the vehicle C, and control the vehicle speed appropriately. Hence, it is possible to enter the main lane Pm with enhanced safety and smoothness.

Figure 8:
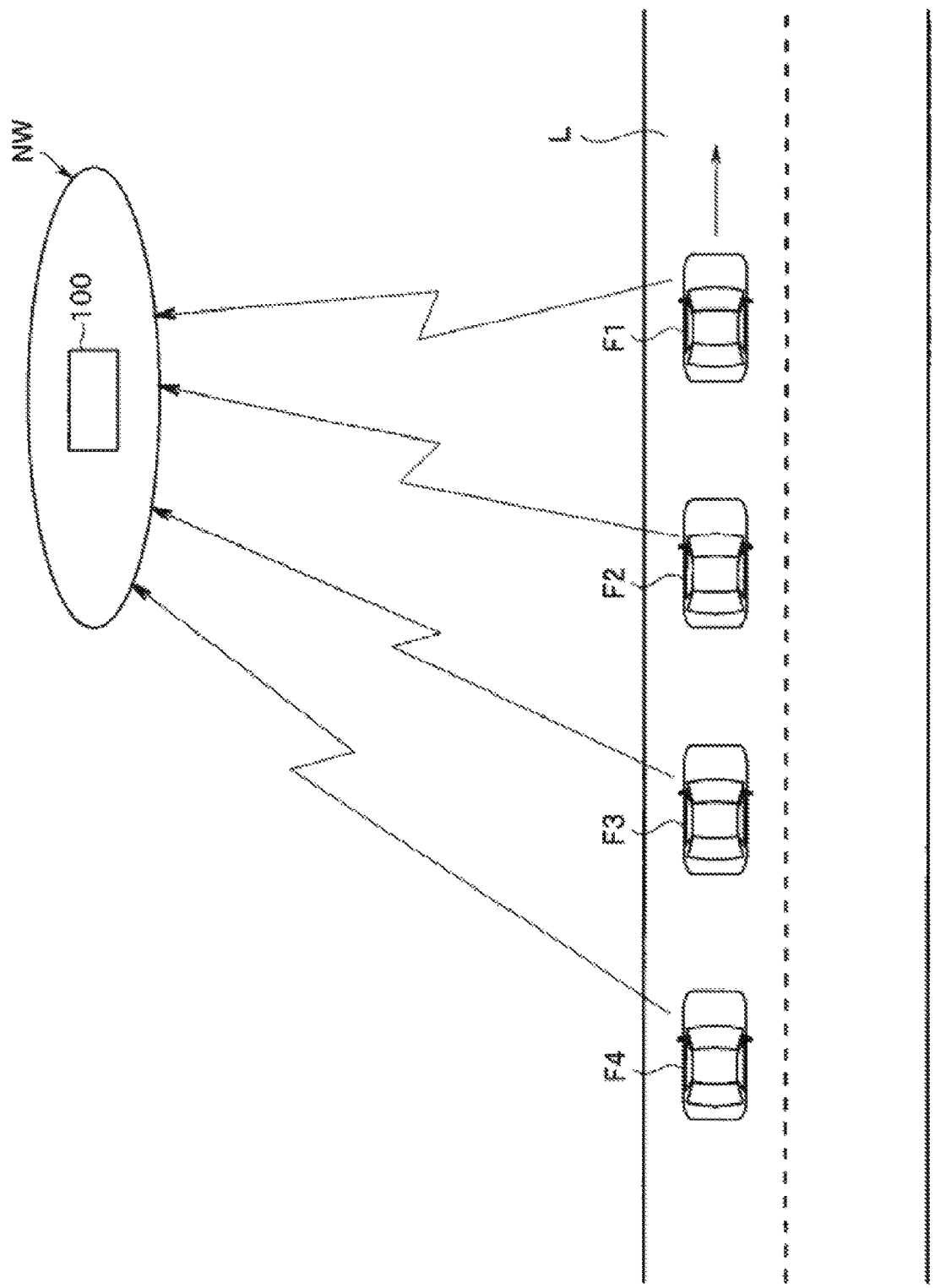
FIG. 8 illustrates a traffic situation of tandem travel of a plurality of vehicles, according to the first embodiment.

As another traffic situation, FIG. 8 illustrates a traffic situation of tandem travel of a plurality of vehicles, in which a vehicle F1, a vehicle F2, a vehicle F3, and a vehicle F4 are traveling in tandem on a same traveling lane L, with the vehicle F1 as a leading vehicle. In such a situation, in a case where the leading vehicle F1 decelerates, if communication between the traffic control apparatus 100 and the vehicles F1, F2, F3, and F4 is normal, it is possible for the last vehicle F4 to immediately recognize the deceleration of the leading vehicle F1 by the data from the traffic control apparatus 100, and to decelerate well in advance.

Let us assume a case where a communication failure occurs in the leading vehicle F1, causing disruption of communication with the traffic control apparatus 100, and the traffic control apparatus 100 finds data regarding the vehicle F1 non-supplementable on the basis of data regarding the subsequent vehicle F2. In this case, the vehicle F2 decelerates in accordance with the deceleration of the vehicle F1, and thereafter, the last vehicle F4 recognizes the deceleration of the vehicle F2 by the data from the traffic control apparatus 100, and decelerates. Thus, the vehicle F4 has to decelerate abruptly, in accordance with the deceleration of the vehicle F1, at a greater deceleration rate than in the case where the communication between the traffic control apparatus 100 and the vehicles F1, F2, F3, and F4 is normal.

In contrast, in a case where the vehicle F2 transmits the data regarding the vehicle F1 to the traffic control apparatus 100, and the traffic control apparatus 100 supplements the data regarding the vehicle F1 and transmits the resultant data to the vehicle F4, it is possible for the last vehicle F4 to quickly recognize the deceleration of the leading vehicle F1 by the data supplemented. This makes it possible for the last vehicle F4 to decelerate well in advance, in accordance with the deceleration of the leading vehicle F1, substantially as with the case where the communication between the traffic control apparatus 100 and the vehicles F1, F2, F3, and F4 is normal. Hence, it is possible to maintain a smooth traffic flow.

Figure 9:
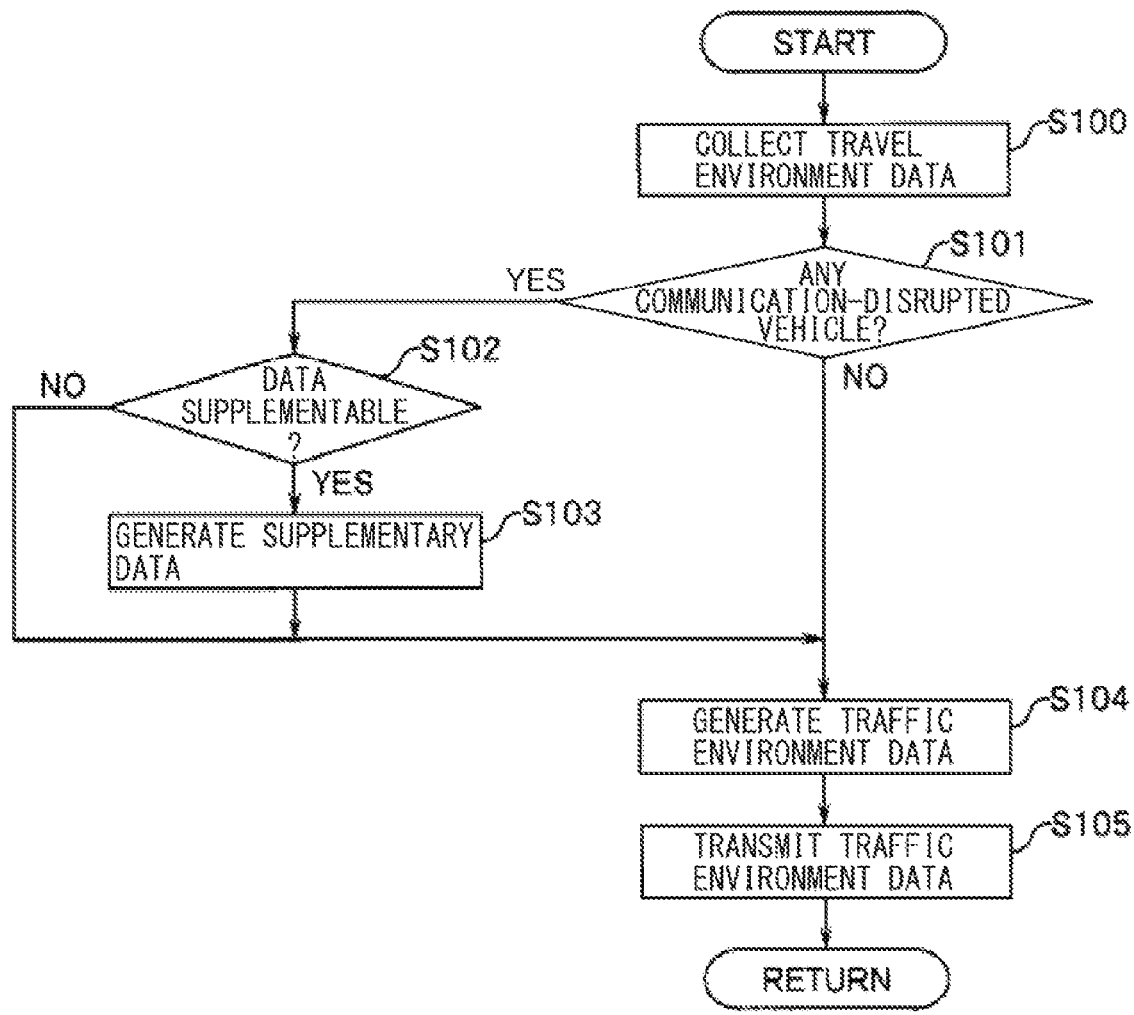
FIG. 9 is a flowchart of processing on traffic control apparatus side, according to the first embodiment.
Figure 10:
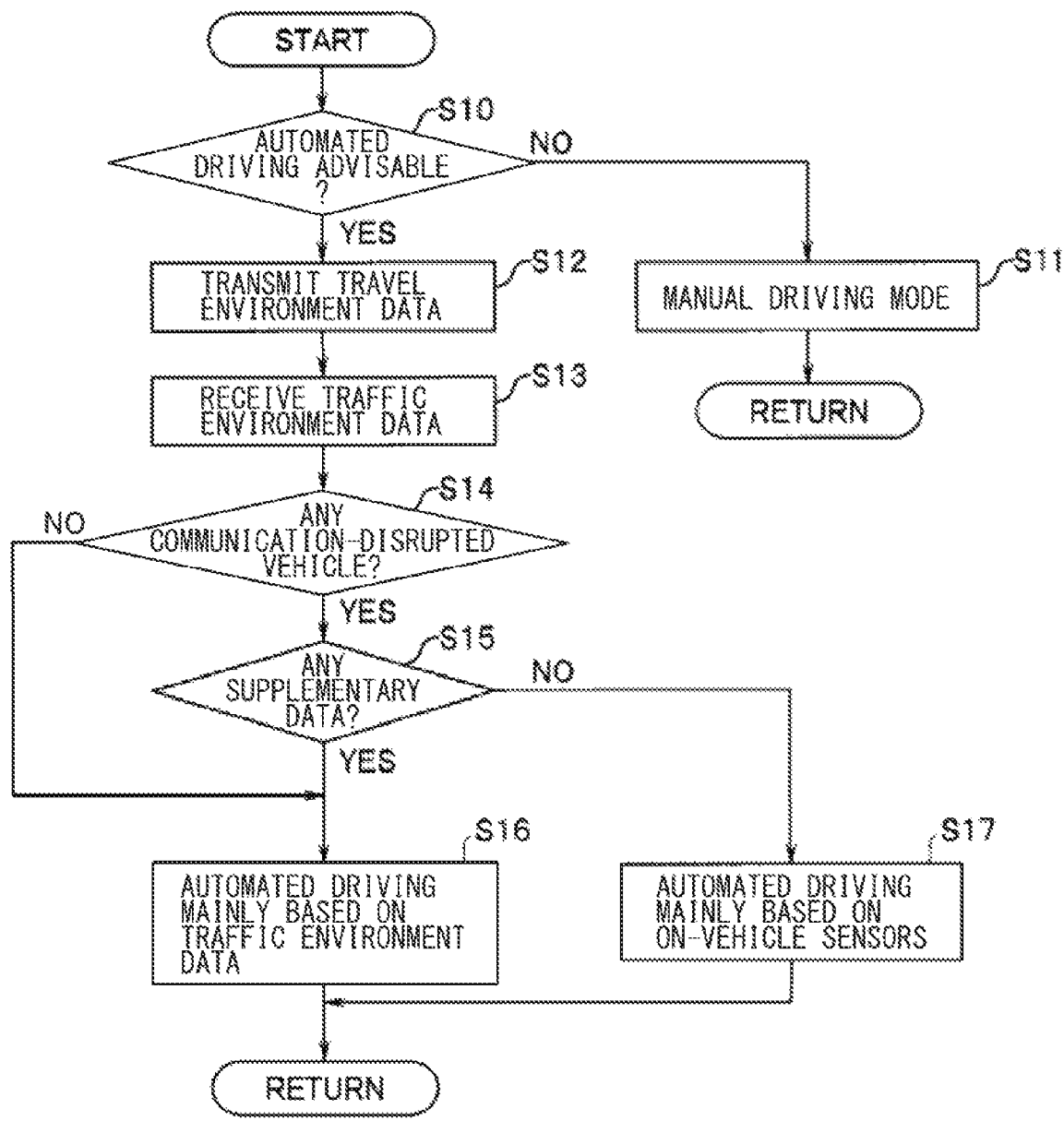
FIG. 10 is a flowchart of processing on vehicle control apparatus side, according to the first embodiment.

Description now moves on to operation of the traffic control system 1 described above, with reference to flowcharts in FIGS. 9 and 10. FIG. 9 is a flowchart of processing on traffic control apparatus side. FIG. 10 is a flowchart of processing on vehicle control apparatus side.

First, the processing on the traffic control apparatus side is described with reference to FIG. 9. In step S100, the traffic control apparatus 100 may collect the travel environment data transmitted from the plurality of the vehicles. In step S101, the traffic control apparatus 100 may check presence or absence of any communication-disrupted vehicle.

In a case with the absence of any communication-disrupted vehicle (No in step S101), the traffic control apparatus 100 may cause the flow to proceed from step S101 to step S104. In step S104, the traffic control apparatus 100 may generate the traffic environment data on the basis of the collected travel environment data. In step S105, the generated traffic environment data may be transmitted to each of the plurality of the vehicles.

In step S101, in a case with the presence of any communication-disrupted vehicle (Yes in step S101), the traffic control apparatus 100 may cause the flow to proceed from step S101 to step S102. In step S102, the traffic control apparatus 100 may determine whether or not the data regarding the communication-disrupted vehicle is supplementable. As described above, a determination as to whether or not the data regarding the communication-disrupted vehicle is supplementable may be made by comparing the data received last from the communication-disrupted vehicle, to the data received from the nearby vehicle, and checking whether or not the conditions (1) to (5) are satisfied.

In a case with a determination that the data regarding the communication-disrupted vehicle is non-supplementable (No in step S102), the traffic control apparatus 100 may cause the flow to proceed from step S102 to step S104. In step S104, the traffic control apparatus 100 may generate the traffic environment data excluding the communication-disrupted vehicle. In step S105, the traffic control apparatus 100 may transmit the resultant data to each of the plurality of the vehicles. In this case, the traffic control apparatus 100 may notify each of the plurality of the vehicles of the presence of the communication-disrupted vehicle and that the traffic environment data to be transmitted is deficient in the data regarding the communication-disrupted vehicle.

In a case with a determination that the data regarding the communication-disrupted vehicle is supplementable (Yes in step S102), the traffic control apparatus 100 may cause the flow to proceed from step S102 to step S103. In step S103, the traffic control apparatus 100 may generate the supplementary data such as the position, the speed, the traveling lane, the vehicle body color, and the vehicle type of the communication-disrupted vehicle, and change the status data regarding the relevant vehicle to clearly indicate that the supplementation of the data regarding the communication-disrupted vehicle is in progress. Thereafter, in step S104, the traffic control apparatus 100 may incorporate the supplementary data regarding the communication-disrupted vehicle in the data regarding the vehicles with normal communication, to generate the traffic environment data. In step S105, the traffic control apparatus 100 may transmit the resultant data to each of the plurality of the vehicles.

Description is given next of the processing on the vehicle control apparatus side, with reference to FIG. 10. In the vehicle control apparatus 10, first, in step S10, the automated driving controller 20 may determine whether or not the automated driving is advisable. For example, in a case where continuation of the automated driving becomes difficult because an abnormality has occurred in a part of the system, or because the own vehicle has moved out of an operation range of the automated driving, the automated driving controller 20 may determine that the continuation of the automated driving is unadvisable (No in step S10), and cause the flow to proceed from step S10 to step S11. In step S11, the automated driving controller 20 may request an occupant to take over the driving. This causes a transition from the automated driving mode to the manual driving mode.

In step S10, in a case where the automated driving is advisable (Yes in step S10), the flow may proceed from step S10 to step S12. In step S12, the automated driving controller 20 may transmit the travel environment data regarding the own vehicle to the traffic control apparatus 100 on cycles of a certain period of time or a certain distance. Thereafter, in step S13, the automated driving controller 20 may receive the traffic environment data from the traffic control apparatus 100. Thereupon, in step S14, the automated driving controller 20 may check the presence or absence of any communication-disrupted vehicle.

In the case with the absence of any communication-disrupted vehicle (No in step S14), the automated driving controller 20 may cause the flow to proceed from step S14 to step S16. In step S16, the automated driving controller 20 may execute the travel control by the automated driving mainly based on the traffic environment data. In the travel control by the automated driving mainly based on the traffic environment data, it is possible to provide a control that takes into consideration movement of a vehicle outside the detection range of the on-vehicle sensor of the own vehicle. This leads to enhanced travel safety and smoothness.

In step S14, in the case with the presence of any communication-disrupted vehicle (Yes in step S14), the flow may proceed to step S15. In step S15, the automated driving controller 20 may check presence or absence of the supplementary data in the traffic environment data from the traffic control apparatus 100. In a case with the absence of the supplementary data from the traffic control apparatus 100 (No in step S15), the automated driving controller 20 may cause the flow to proceed from step S15 to step S17. In step S17, the automated driving controller 20 may execute the travel control by the automated driving mainly based on the on-vehicle sensors. In the travel control by the automated driving mainly based on the on-vehicle sensors, it is possible to provide enhanced safety by the travel control based on the exterior environment recognized autonomously. It is also possible to provide the smooth travel with the complementary use of the traffic environment data from the traffic control apparatus 100.

In a case with the presence of the supplementary data from the traffic control apparatus 100 (Yes in step S15), the automated driving controller 20 may cause the flow to proceed from step S15 to step S16. In step S16, the automated driving controller 20 may execute the travel control by the automated driving mainly based on the traffic environment data. In this case, in the travel control by the automated driving mainly based on the traffic environment data, the supplementary data regarding the communication-disrupted vehicle makes it possible to provide the control that takes into consideration the movement of the vehicle outside the detection range of the on-vehicle sensors of the own vehicle, as with the case with the absence of any communication-disrupted vehicle. This leads to enhanced travel safety and smoothness.

As described, in this embodiment, the travel environment data is collected by the communication with the plurality of the vehicles. On the basis of the travel environment data collected, the traffic environment data regarding the surroundings of the plurality of the vehicles is generated. At this occasion, in the case with the presence of any communication-disrupted vehicle having the disruption of communication, the determination is made as to whether the data regarding the communication-disrupted vehicle is supplementable on the basis of the data regarding the nearby vehicle. In the case where the data regarding the communication-disrupted vehicle is supplementable, the traffic environment data is generated that is supplemented with the data regarding the communication-disrupted vehicle. The resultant traffic environment data is transmitted to each of the plurality of the vehicles. Hence, it is possible to avoid the deficiency in the data because of the disruption of communication of some of the plurality of the vehicles, leading to a stable and smooth traffic flow.

Figure 11:
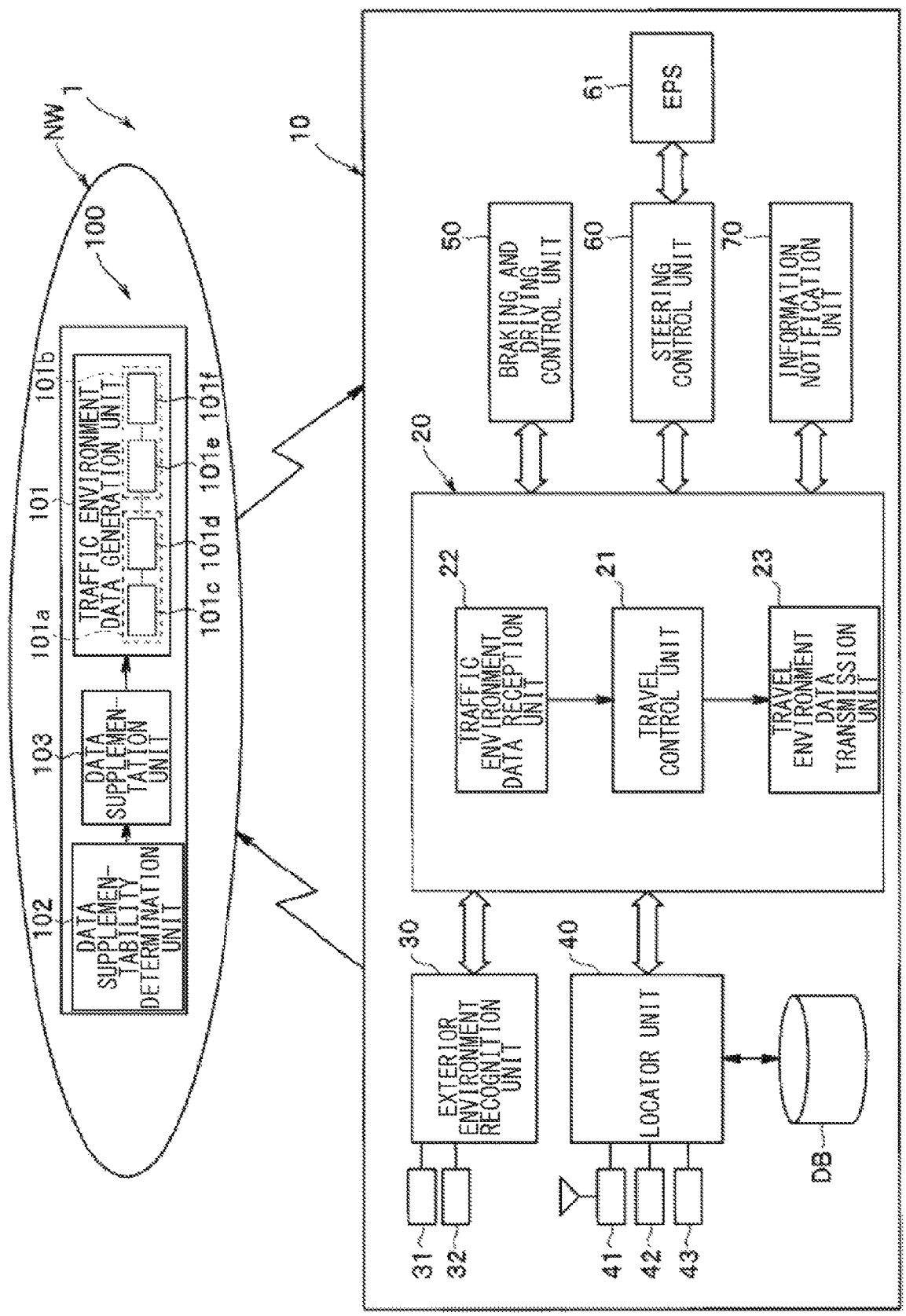
FIG. 11 is an overall configuration diagram of a traffic control system, according to a second embodiment.

Description is given next of a second embodiment of the disclosure. FIG. 11 illustrates an overall configuration of a traffic control system according to the second embodiment. This embodiment mainly describes a configuration in which simulated sensor data is generated on the basis of the traffic environment data to be generated in the traffic control apparatus 100. It is to be noted that in this embodiment, for purposes of simple description, a particular vehicle A out of the plurality of vehicles is referred to as an "own vehicle A", and description is given of relation of the own vehicle A to the traffic control apparatus 100.

In this embodiment, the traffic environment data generation unit 101 of the traffic control apparatus 100 may include an input data compilation device 101a and an output data compilation device 101b. The input data compilation device 101a may include a data accumulation unit 101c and a current state map data creation unit 101d. The output data compilation device 101b may include a forward region calculation unit 101e and a calculation transmission unit 101f.

The data accumulation unit 101c may collect peripheral data and regional data through the network NW, and accumulate the collected data as the traffic environment data. The peripheral data may include, for example, data from a mobile phone terminal, a roadside traffic system such as a traffic signal, an advanced traffic system, and a traffic system server. The mobile phone terminal may be a terminal configured to be coupled to the network NW. The peripheral data may further include GNSS signals and various kinds of data held by each vehicle. The data held by each vehicle may include, for example, a temperature of the surroundings of each vehicle, the weather, shaded places on roads, positions of humans and structural objects, surrounding vehicles, lanes, and road data. The regional data may include various kinds of data such as weather forecasts regarding a region where the relevant vehicle is currently located or a region where the relevant vehicle is scheduled to travel, unique wind directions, event information such as festivals, and setting of High-Occupancy Vehicle.

These groups of data may have two pieces of time data: system transmission absolute time; and server time. The system transmission absolute time is time at which the data is collected. The server time is time at which the current state map data creation unit 101d imparts time data.

The current state map data creation unit 101d may generate current state map data regarding a path to a destination, from map data, the peripheral data and the regional data collected. The map data may include, for example, road data. VICS (registered trademark) data constituting the regional data may be collected by the traffic control apparatus 100, or alternatively, the VICS (registered trademark) data may be collected by the own vehicle A and transmitted to the traffic control apparatus 100. Time of collection of the regional data may be scheduled transit time, vehicle time, or the server time. In a case where the own vehicle A is stopped and parked, and is available for collection of the peripheral data and the regional data, the own vehicle A may collect the peripheral data and the regional data. Regardless of whether the own vehicle A is traveling, stopped, or parked, communication may be made regarding the collected data, as long as communication with the traffic control apparatus 100 is available.

The forward region calculation unit 101e may make simulation, using the current state map data, of relative positional relation of the own vehicle A to the plurality of the vehicles at actual traveling absolute time on the path to the destination. A result of the simulation, i.e., a forward region predictive calculation result, may be calculated, in additional consideration of a region that the own vehicle A is inhibited from entering on the basis of specific data held by the own vehicle A, and in additional consideration of a region that the own vehicle A is inhibited from passing through before time of arrival of the own vehicle A at the destination on the basis of the current state map data.

The calculation transmission unit 101f may transmit the forward region predictive calculation result to the own vehicle A through the network NW. The own vehicle A may receive the forward region predictive calculation result, and determine, on the basis of the forward region predictive calculation result, a travel path, i.e., a forward region at predetermined time to the destination. In a case where the own vehicle A is a vehicle configured to perform the automated driving, the own vehicle A may travel by the automated driving in accordance with the forward region.

The traffic control apparatus 100 may be provided in, for example, a base station for mobile phone, and the network may be a mobile phone network. Let us assume a case where the own vehicle A makes setting of movement over a relatively large area such as movement on a highway. In this case, in the own vehicle A, an occupant may operate a navigation system to provide the setting of a traveling route to the destination.

The traffic control apparatus 100 may allow the current state map data creation unit 101d to generate the current state map data to the destination on the basis of a request for travel. The traffic control apparatus 100 may output the current state map data to the forward region calculation unit 101e.

The forward region calculation unit 101e may perform simulation of the travel of the own vehicle A to the destination, on the current state map data to the destination of the own vehicle A. Thus, the forward region calculation unit 101e may perform road assignment processing, i.e., "Path".

The own vehicle A may output various kinds of data to a display device of the information notification unit 70, or start the travel by the automated driving, on the basis of the received forward region predictive calculation result and the peripheral data regarding the own vehicle A at time of reception of the forward region predictive calculation result.

The server time and a server ID may be attached to the received forward region predictive calculation result. The own vehicle A may store the received forward region predictive calculation result, the server time, and the server ID. The own vehicle A may hold the server ID as the specific data regarding the vehicle. In making a request for calculation of behavior, i.e., a behavior request, the own vehicle A may transmit, to the traffic control apparatus 100, the specific data regarding the vehicle including the server ID.

In a case where the own vehicle A passes through a plurality of ranges under the control of, or the assistance by, respective traffic control apparatuses 100, until arrival at the destination of the own vehicle A, when the own vehicle A is located outside the range of the traffic control apparatus 100 that is supposed to respond to the behavior request, the own vehicle A fails in obtaining a response. The traffic control apparatus 100 also fails in transmitting the forward region predictive calculation result. Thus, the data remains unprocessed.

In communicating, there may be a case with time deviation between the server time held by the own vehicle A and the time held by a vehicle other than the own vehicle A, e.g., a surrounding vehicle B, or a traffic system. In such a case, the own vehicle A may determine that the own vehicle A is located outside a communication range of the server apparatus, i.e., the traffic control apparatus 100, including the input data compilation device 101a and the output data compilation device 101b. Thus, the own vehicle A may update the server time held by the own vehicle A, with travel surrounding time held by the vehicle other than the own vehicle A, and/or the traffic system, to update the server time and the server ID held by the own vehicle A. Thus, it is possible to avoid any expected interference due to the time deviation with respect to the surroundings. Moreover, even in a case with incomplete coverage over data involved in the arrival at the destination, it is possible to behave in accordance with surrounding vehicles around the own vehicle A.

Figure 12:
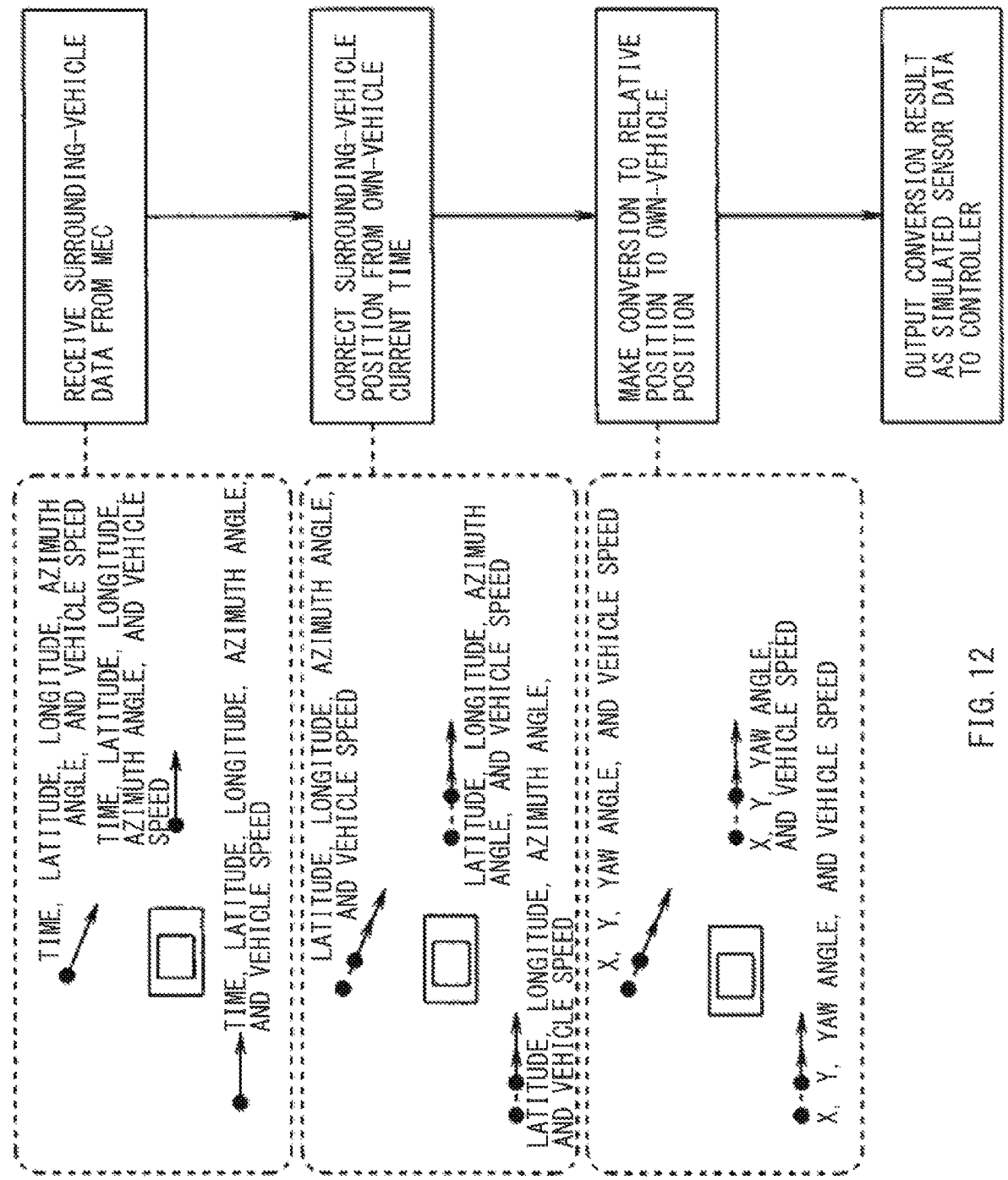
FIG. 12 illustrates locator processing with respect to MEC server data, according to the second embodiment.
Figure 13:
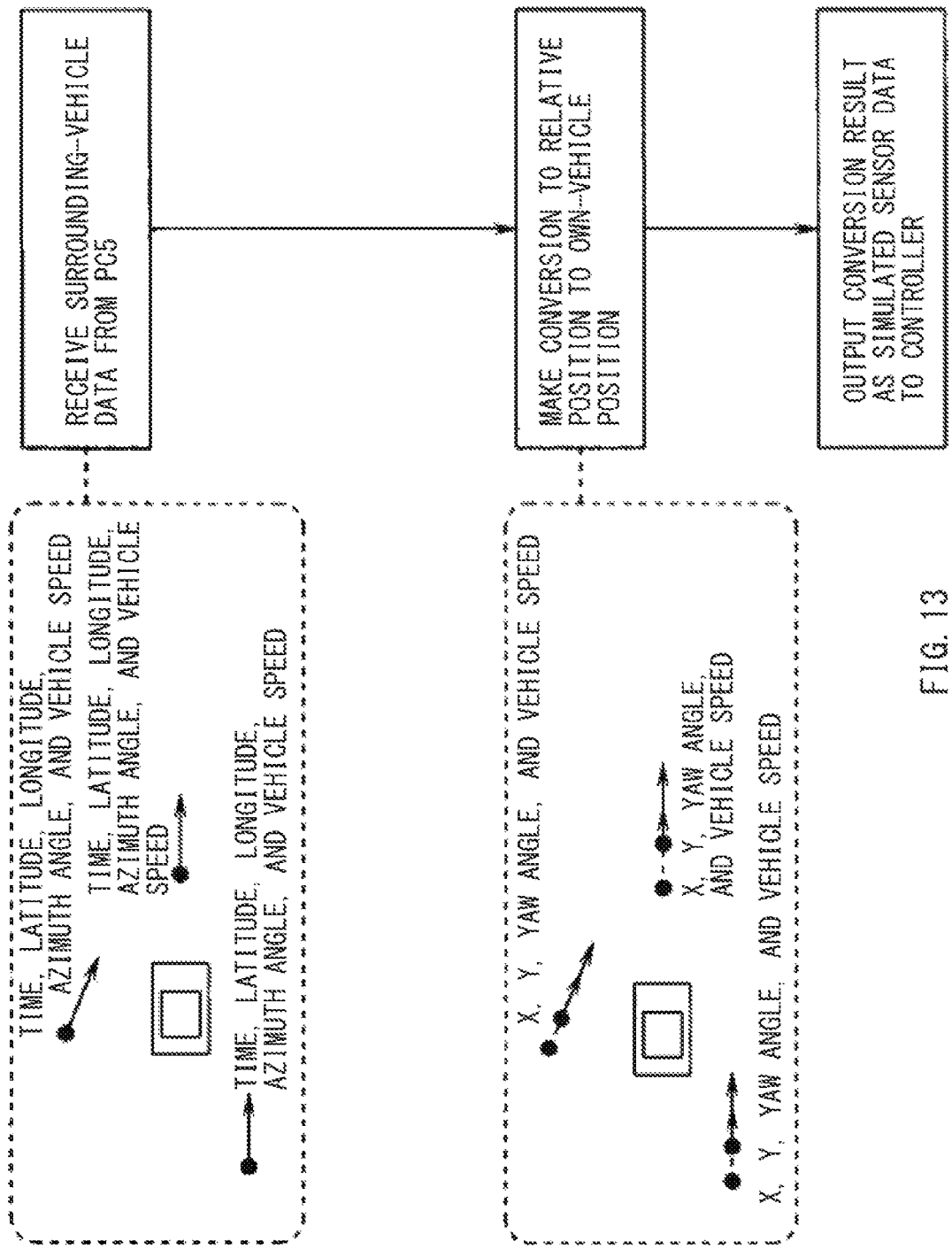
FIG. 13 illustrates the locator processing with respect to PC5 data, according to the second embodiment.

FIGS. 12 and 13 illustrate locator processing according to this embodiment. In the locator processing, the traffic control apparatus 100 may change a coordinate system (X1, Y1) of the traffic environment data to a polar coordinate system (vector component) having azimuth angle data and position data used in the sensors of the own vehicle A.

Spatial data included in the travel environment data from each of the vehicles may include numerical data that allows the spatial data to be disposed at a certain location on the earth. The numeral may constitute part of the coordinate system (spatial coordinates) that provides a data reference frame. Thus, it is possible for the traffic environment data generation unit 101 to specify the spatial data on the surface of the earth, to align a position of a piece of data with that of another piece of data as a reference, and to perform analysis with high spatial precision, and to create the traffic environment data. The data may be defined in both horizontal and vertical coordinate systems. In the horizontal coordinate system, the data may be specified on the entire surface of the earth. In the vertical coordinate system, it is possible to specify a relative height or depth regarding the data. In the predictive calculation in plane coordinates, the horizontal coordinate system is sufficient. Calculation in stereo coordinates involves the vertical coordinate system. In conversion into the coordinate system, the origin may be provided at the own vehicle A as an own vehicle, or the surrounding vehicle B around the own vehicle A, or alternatively, the origin may be provided at the traffic control apparatus 100. Each vehicle, e.g., the own vehicle A and the surrounding vehicle B, includes the terminal. The own vehicle A and the surrounding vehicle B may notify the traffic control apparatus 100 of vehicle travel data, i.e., the travel environment data, regarding each vehicle, through the network, at predetermined time intervals and/or at predetermined distance intervals. In the traffic environment data generation unit 101, the current state map data creation unit 101d may generate the current state map data. The forward region calculation unit 101e may perform the simulation, i.e., the calculation, regarding the traffic environment data included in the current state map data, and convert the traffic environment data included in the current state map data, into data regarding a relative position to the position of the own vehicle A as a reference. The calculation transmission unit 101f may output the data regarding the relative position after the conversion, as the forward region predictive calculation result, to the own vehicle A. The forward region predictive calculation result may include a simulated output sensor value that is comparable to the detection value by a sensor system of the own vehicle A. By comparing the detection data in the own vehicle A to the simulated output sensor value, it is possible to recognize presence of, for example, a surrounding vehicle located outside a recognition range of the own vehicle A. Moreover, in a case with a delay in data transmission in the network, or in a case where performance of the sensor system of the own vehicle A is lowered or unavailable, or even in a case with blind spots that are invisible originally, it is possible for the own vehicle A to travel with the forward region predictive calculation result as the result of the predictive calculation. Furthermore, using the simulated sensor data makes it possible to travel on the basis of simulated data, leading to higher level of safety.

It is to be noted that a unit or circuitry as the forward region calculation unit 101*e* may be provided in the own vehicle A instead of the traffic control apparatus 100.

Figure 14:
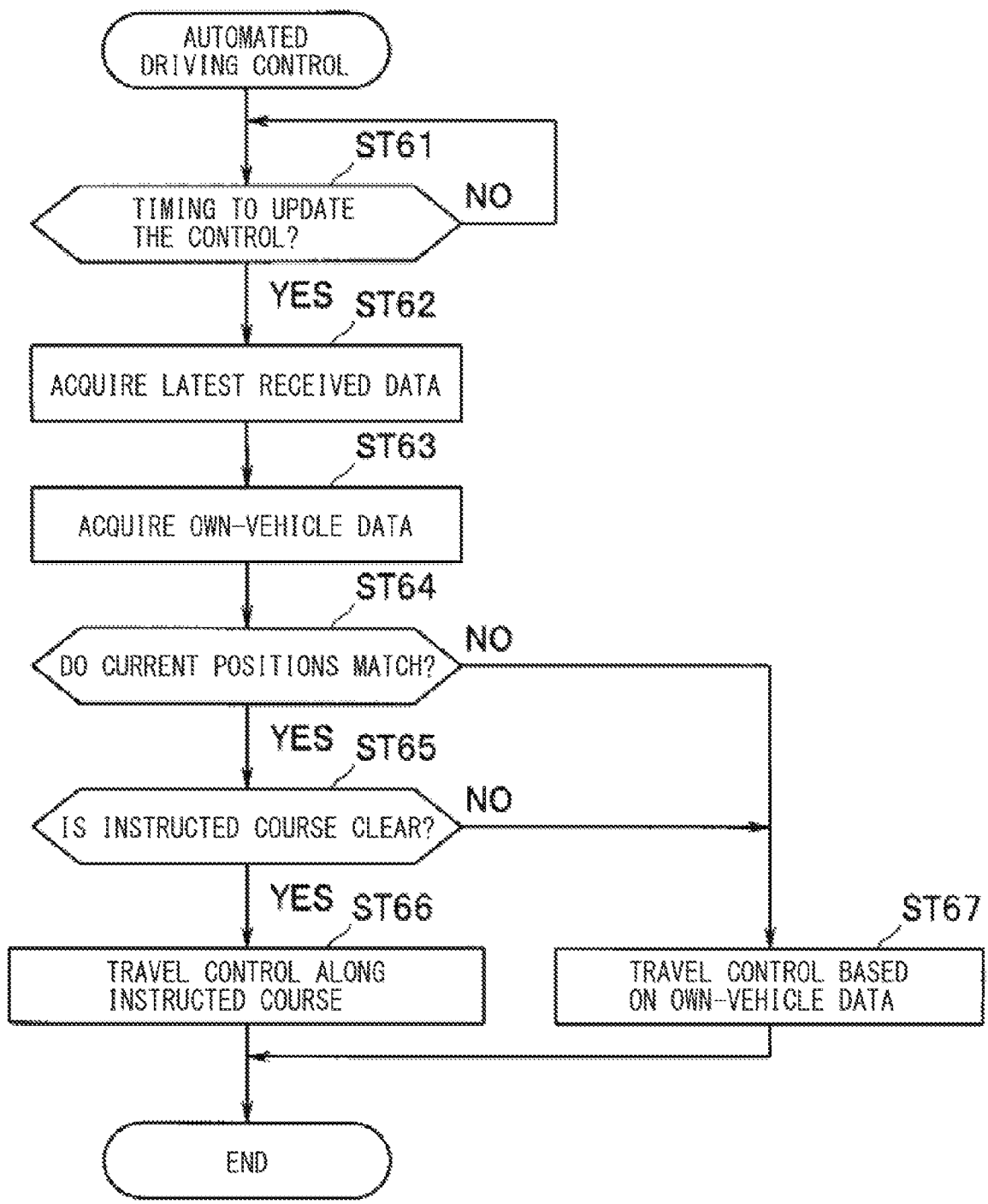
FIG. 14 is a flowchart of processing of controlling automated driving or driver assistance for an automobile, according to the second embodiment.

Description is given next of examples of the disclosure. FIG. 14 is a flowchart of processing of controlling the automated driving or driver assistance for the own vehicle A, by the travel control unit 21 of the vehicle control apparatus 10.

The travel control unit 21 may control the travel of the own vehicle A. The travel control unit 21 may repetitively execute the travel control of FIG. 14. In this case, a period for repetition may be, for example, several tens of milliseconds to several hundred milliseconds, both inclusive.

In step ST61, the travel control unit 21 may determine whether or not it is timing to update the control. The travel control unit 21 may determine, on the basis of current time of the receiver 41, whether or not lapsed time from previous control timing is longer than a predetermined period for an update. Alternatively, the travel control unit 21 may estimate time of an end of the control along the route currently being executed, and determine whether or not time left until the estimated time is smaller than a threshold. In a case where the lapsed time is shorter than the period for the update (No in step ST61), the travel control unit 21 may repeat the determination process of step ST61. In a case where the lapsed time is longer than the period for the update, and it is the timing to update the control (Yes in step ST61), the travel control unit 21 may cause the flow to proceed to step ST62.

In step ST62, the travel control unit 21 may acquire the latest traffic environment data, or primary processed data, through the traffic environment data reception unit 22. The travel control unit 21 may acquire the latest traffic environment data in the traffic control apparatus 100 through the traffic environment data reception unit 22. The travel control unit 21 may further acquire not only the latest traffic environment data but also any other pieces of the traffic environment data previously received. Acquiring a plurality of pieces of the traffic environment data makes it possible to grasp a change in movement of, for example, each vehicle.

In step ST63, the travel control unit 21 may acquire the own-vehicle data from each part of the own vehicle. The travel control unit 21 may acquire, for example, the current position and the data regarding surrounding moving objects nearby, from the exterior environment recognition unit 30 and the locator unit 40. In the case of the driver assistance, the travel control unit 21 may acquire data regarding operations by the driver.

In step ST64, the travel control unit 21 may determine matching of the traffic environment data with the actual current position. The travel control unit 21 may compare the current position detected by the own vehicle A to a position at current timing included in the latest traffic environment data. In a case where the positions match with a minute error that does not interfere with the travel control (Yes in step ST64), the travel control unit 21 may determine that the current positions match, and cause the flow to proceed to step ST65. In a case where the positions deviate by a difference greater than the minute error (No in step ST64), the travel control unit 21 may determine that the current positions do not match, and cause the flow to proceed to step ST67.

In step ST65, the travel control unit 21 may determine whether or not a course from the current position instructed by the latest traffic environment data is clear, or available for the travel. The travel control unit 21 may determine presence or absence of a foreign matter, an abnormality, an unanticipated condition, or other moving objects passing through, with respect to the instructed course or a travelable range, on the basis of, for example, the peripheral data detected by the own vehicle and acquired. In a case with the absence of any possible interference as exemplified above (Yes in step ST65), the travel control unit 21 may determine that the instructed course is clear, and cause the flow to proceed to step ST66. In a case with the presence of any interference as exemplified above, or in a case with the presence of any possible interference as exemplified above (No in step ST65), the travel control unit 21 may determine that the instructed course or the travelable range is not clear, and cause the flow to proceed to step ST67.

It is to be noted that the travel control unit 21 not only may determine whether or not the instructed course is clear, on the basis of the peripheral data detected by the own vehicle by the autonomous sensor and acquired, but also compare the detection value of the autonomous sensor to the data included in the latest traffic environment data. Thus, the travel control unit 21 may determine, on the basis of an error between them, whether or not the instructed course is clear. In a case with a difference in kinds of physical quantities or in the coordinate systems between the detection value of the autonomous sensor and the data to be acquired from the outside, the travel control unit 21 may convert the physical quantity or the coordinate system of the data to be acquired from the outside, into those comparable to the detection value of the autonomous sensor. Thus, the travel control unit 21 may compare the simulated sensor value thus converted, to the detection value of the autonomous sensor. In a case where the error is equal to or greater than a threshold, the travel control unit 21 may determine that the instructed course or the travelable range is not clear, and cause the flow to proceed to step ST67. In a case where the error is smaller than the threshold, the travel control unit 21 may determine that the instructed course is clear, and cause the flow to proceed to step ST66.

In step ST66, the travel control unit 21 may make the travel control in accordance with the instructed course.

The travel control unit 21 may generate the instructed course or a course within the instructed travelable range, as travel control data. In a case where the travel control unit 21 has acquired, from the traffic control apparatus 100, a course as a vector including an azimuth and a distance or time, the travel control unit 21 may generate the travel control data along the course. In a case where the travel control unit 21 has acquired, from the traffic control apparatus 100, a safe travelable range expected to allow the own vehicle to forward, the travel control unit 21 may calculate a vector having a direction and a distance or time that allows for farthest travel within the travelable range, and generate a course by the vector as the travel control data.

The travel control unit 21 may control the travel of the own vehicle on the basis of the generated travel control data. In the case of the driver assistance, the travel control unit 21 may adjust the operation by the driver not to cause a significant deviation from the course based on the travel control data generated. At this occasion, the travel control unit 21 may adjust the operation by the driver not to cause a deviation from the instructed travelable range.

In this way, the travel control unit 21 may determine the course of the own vehicle A, and make the travel control or provide the driver assistance, on the basis of the traffic environment data obtained on the basis of field data, i.e., the travel environment data, received by the own vehicle A. The field data is data related to movement of a plurality of moving objects.

In step ST67, the travel control unit 21 may generate the travel control data on the basis of the data independently detected by the autonomous sensor of the own vehicle, rather than the instructed course. At this occasion, to obtain the travel control data based on the autonomous sensor, the travel control unit 21 may use the data regarding the instructed course or the travelable range as complementary data, and generate the travel control data not to deviate from the instruction.

The travel control unit 21 may control the travel of the own vehicle A by the generated travel control data. In the case of the driver assistance, the travel control unit 21 may adjust the operation by the driver not to cause a significant deviation from the course by the generated travel control data. At this occasion, the travel control unit 21 may adjust the operation by the driver not to cause a deviation from the instructed travelable range.

In this way, in the own vehicle A as a moving body, the travel control unit 21 may acquire the traffic environment data received by the traffic environment data reception unit 22, generate the travel control data from the traffic environment data, and make the travel control of the own vehicle A or provide the own vehicle A with the driver assistance, on the basis of the generated travel control data. The travel control unit 21 may make a determination as to movement of the own vehicle A or make a control of the movement of the own vehicle A, in accordance with the course instructed in the traffic environment data acquired, to make the travel control of the own vehicle A or provide the own vehicle A with the driver assistance. Here, the travel control data is secondary processed data to be used in making the determination as to the movement of the own vehicle A or making the control of the movement of the own vehicle A.

It is to be noted that unlike this embodiment, the own vehicle A may receive data other than the data regarding the course or the travelable range, for example, the field data, from an unillustrated radio base station. In this case, the travel control unit 21 may generate the course or the travelable range by the same processing as that of the traffic control apparatus 100 on the basis of the data acquired by the reception, and execute the processing of FIG. 14 on the basis of the course or the travelable range thus generated. In this case, the travel control unit 21 may generate, from the field data, data regarding the course or the travelable range in a minute section that allows the own vehicle to travel. On the basis of the data thus generated, the travel control unit 21 may execute the processing of FIG. 14.

As described, in this embodiment, the traffic control apparatus 100 may collect the field data regarding the movement of each of the vehicles as the plurality of the moving bodies. On the basis of the collected field data, the traffic control apparatus 100 may generate the course or the safe travelable range in the minute section that allows each moving body to safely forward without, for example, a collision with each other. The traffic control apparatus 100 may transmit the course or the safe travelable range in the minute section thus generated, to the traffic environment data reception unit 22 of each of the plurality of vehicles, as the traffic environment data. The traffic environment data reception unit 22 of the vehicle may receive, from the traffic control apparatus 100, the traffic environment data regarding the mobile bodies. The traffic environment data regarding the mobile bodies may be used by each of the moving bodies, i.e., each of the vehicles. Thus, it is possible for the traffic environment data reception unit 22 to acquire data regarding the course for the movement of the own vehicle in consideration of courses along which surrounding moving bodies travel. Each of the moving bodies may obtain the data regarding its own course in consideration of the courses along which surrounding moving bodies move. Each of the moving bodies may forward in accordance with the obtained data. This makes it possible to prevent each of the moving bodies from being affected by an unanticipated movement of the surrounding moving bodies. Allowing moving bodies such as a plurality of vehicles to move in accordance with common data makes it possible for the moving bodies to travel with enhanced safety with respect to one another.

In the traffic control system 1 of this embodiment, the vehicle control apparatus 10 of the own vehicle A may make the travel control the own vehicle A with the more prioritized use of the data detected by the autonomous sensor provided in the own vehicle A than the data received from the traffic control apparatus 100.

Depending on travel environment, some of the autonomous sensors may not be able to make detection with sufficient accuracy. Accordingly, the vehicle control apparatus 10 of the own vehicle A may include more kinds of the autonomous sensors, to make the travel control on the basis of their comprehensive detection. However, unlimitedly increasing the number of autonomous sensors configured to make detection with such high accuracy is undesirable in the manufacture of automobiles. Moreover, even in a case with the increased number of kinds of the autonomous sensors, it is difficult to make detection with sufficient accuracy in all travel environment.

Description is given below of an example to cope with such a situation.

Figure 15:
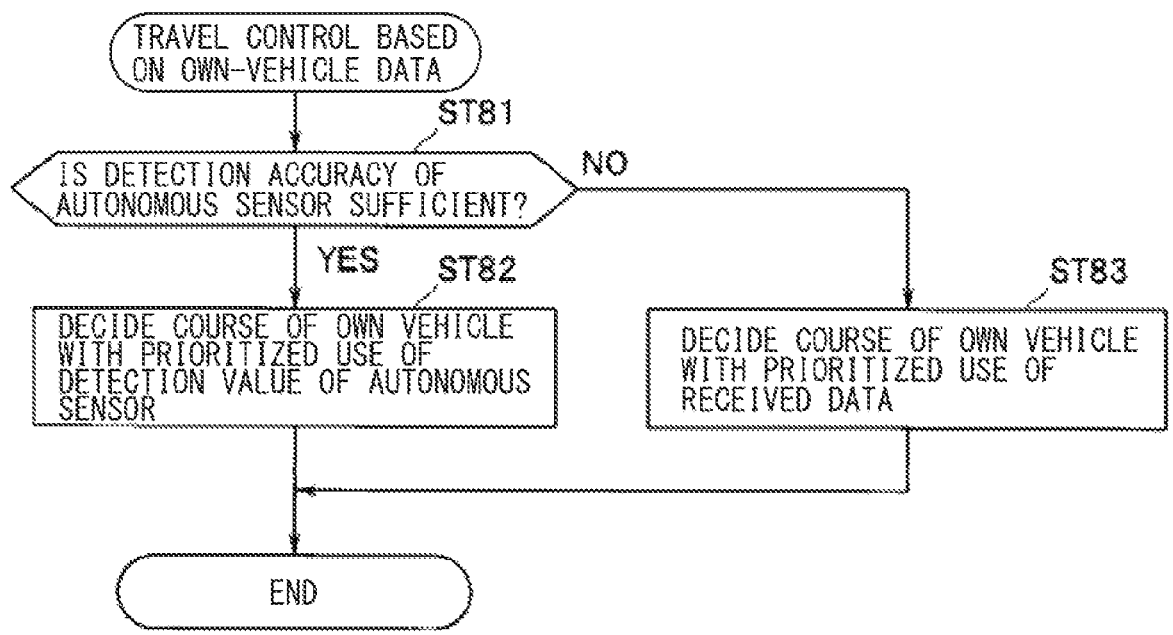
FIG. 15 is a flowchart of detailed processing regarding step ST67 in FIG. 14, according to the second embodiment.

FIG. 15 is a flowchart of detailed processing regarding step ST67 in FIG. 14.

In step ST67 in FIG. 14, the travel control unit 21 of the own vehicle A may execute the processing in FIG. 15.

In step ST81, the travel control unit 21 may determine whether or not the detection accuracy of the autonomous sensor is sufficient. The autonomous sensor may include, for example, a stereo camera that captures, for example, images frontward of the own vehicle A. In backlit or other conditions, the stereo camera may sometimes produce obscure images of nearby moving objects or lanes on the road surface. In a case where the images produced are not obscure (Yes in step ST81), the travel control unit 21 may determine that the detection accuracy of the autonomous sensor is sufficient, and cause the flow to proceed to step ST82. In a case where the images produced are obscure (No in step ST81), the travel control unit 21 may determine that the detection accuracy of the autonomous sensor is not sufficient, and cause the flow to proceed to step ST83.

In step ST82, the travel control unit 21 may decide the course for the travel control of the own vehicle A, with the more prioritized use of the detection value of the autonomous sensor than the data received from the traffic control apparatus 100 through, for example, the radio base station.

In step ST83, the travel control unit 21 may decide the course for the travel control of the own vehicle A, with the more prioritized use of the data received from the traffic control apparatus 100 than the detection value of the autonomous sensor. The travel control unit 21 may generate the simulated sensor data of the same physical quantity and the same form as the detection data of the autonomous sensor, from the data received from the traffic control apparatus 100. The travel control unit 21 may use the resultant data, to decide the course for the travel control of the own vehicle A.

As described, in this embodiment, the priority may be switched between the detection value of the autonomous sensor and the data received from the traffic control apparatus 100, in accordance with the detection accuracy of the autonomous sensor. In this embodiment, for example, it is possible to cope with a temporary loss of visibility.

For example, if a stereo camera loses image recognition or falls below thresholds in the backlit condition, a traffic control using the traffic environment data may be in temporarily more prioritized use than the data from the stereo camera. Since the data included in the traffic environment data is data in birds'-eye view in a minute time period, it is possible to extract a course taken by a preceding vehicle. The data included in the traffic environment data may also incorporate data by autonomous sensor of the surrounding automobiles B and C.

In a case of an automatic brake control, for example, when the autonomous sensor is unsuitable for use, with a recognition rate of the autonomous sensor being 80% or lower, the travel control unit 21 may compare a recognition result of the autonomous sensor to the data in the traffic environment data. In a case with a difference between them greater than a threshold, the travel control unit 21 may give more priority to the data in the traffic environment data than the recognition result of the autonomous sensor.

In a case where some of the autonomous sensors have low detection accuracy, the travel control unit 21 may generate the simulated sensor data based on the data included in the traffic environment data, instead of the detection data by the autonomous sensor having low detection accuracy. The travel control unit 21 may form a combination of the simulated sensor data thus generated, with the data by the other autonomous sensors, to use the combination in deciding the course for the travel control of the own vehicle A.

According to the aspects of the technology, in collecting the data from the plurality of the vehicles to transmit the data related to the traffic environment to each of the vehicles, it is possible to provide a stable traffic flow even in the case with some of the vehicles having disruption of communication.

The vehicle control apparatuses 10 and the traffic control apparatus 100 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle control apparatuses 10 and the traffic control apparatus 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle control apparatuses 10 and the traffic control apparatus 100 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A traffic control system, comprising:
a vehicle control apparatus configured to transmit travel environment data regarding an own vehicle; and
a traffic control apparatus configured to receive the travel environment data from the vehicle control apparatus of each of a plurality of vehicles, and transmit, to each of the plurality of the vehicles, traffic environment data based on the travel environment data received,
the vehicle control apparatus including
a travel environment data transmission unit configured to transmit the travel environment data to the traffic control apparatus, the travel environment data including travel data and appearance data regarding the own vehicle, and detection data regarding exterior environment around the own vehicle, the detection data including appearance data regarding a surrounding vehicle, and
a travel control unit configured to control travel of the own vehicle on a basis of the traffic environment data received from the traffic control apparatus, the travel environment data regarding the own vehicle, or both,
the traffic control apparatus including
a data supplementability determination unit configured to determine whether or not data regarding a communication-disrupted vehicle out of the plurality of the vehicles is supplementable on a basis of the travel environment data received from a nearby vehicle traveling near the communication-disrupted vehicle, the communication-disrupted vehicle having disruption of communication, and
a data supplementation unit configured to generate, on a condition that the data supplementability determination unit determines that the data regarding the communication-disrupted vehicle is supplementable, the traffic environment data supplemented with the data regarding the communication-disrupted vehicle, on the basis of the travel environment data received from the nearby vehicle, and transmit the traffic environment data generated, to the nearby vehicle.

2. The traffic control system according to claim 1, wherein the data supplementability determination unit is configured to determine that the data regarding the communication-disrupted vehicle is supplementable, on a condition that the traffic environment data received from the communication-disrupted vehicle before the disruption of communication and the traffic environment data received from the nearby vehicle after the disruption of communication match under a predetermined condition.

3. The traffic control system according to claim 1, wherein the data supplementability determination unit is configured to exclude the communication-disrupted vehicle from a target of supplementation, on a condition that the data supplementability determination unit determines, on a basis of the travel environment data received from the nearby vehicle, that the communication-disrupted vehicle has made a lane change or that the communication-disrupted vehicle has moved out of a detection range of the nearby vehicle.

4. The traffic control system according to claim 2, wherein the data supplementability determination unit is configured to exclude the communication-disrupted vehicle from a target of supplementation, on a condition that the data supplementability determination unit determines, on a basis of the travel environment data received from the nearby vehicle, that the communication-disrupted vehicle has made a lane change or that the communication-disrupted vehicle has moved out of a detection range of the nearby vehicle.

5. The traffic control system according to claim 1, wherein the travel environment data transmission unit is configured to transmit data regarding a vehicle body color and a vehicle type, as the appearance data regarding the own vehicle and the surrounding vehicle.

6. The traffic control system according to claim 2, wherein the travel environment data transmission unit is configured to transmit data regarding a vehicle body color and a vehicle type, as the appearance data regarding the own vehicle and the surrounding vehicle.

7. The traffic control system according to claim 1, wherein the traffic control apparatus is configured to transmit, to the nearby vehicle, status data regarding the communication-disrupted vehicle, the status data indicating that the communication-disrupted vehicle is having the disruption of communication and that supplementation of the data regarding the communication-disrupted vehicle is in progress.

8. The traffic control system according to claim 2, wherein the traffic control apparatus is configured to transmit, to the nearby vehicle, status data regarding the communication-disrupted vehicle, the status data indicating that the communication-disrupted vehicle is having the disruption of communication and that supplementation of the data regarding the communication-disrupted vehicle is in progress.

9. The traffic control system according to claim 1, wherein the traffic control apparatus comprises a server device in a network environment to which the vehicle control apparatus of each of the plurality of the vehicles is coupled.

10. The traffic control system according to claim 2, wherein the traffic control apparatus comprises a server device in a network environment to which the vehicle control apparatus of each of the plurality of the vehicles is coupled.

11. The traffic control system according to claim 1, wherein
the travel environment data includes map data, regional data, or both, the regional data including data regarding a location of the own vehicle,
the traffic control apparatus further includes an input data compilation device, and an output data compilation device,
the input data compilation device including
a data accumulation unit configured to accumulate the travel environment data, and
a current state map data creation unit configured to create current state map data regarding a path to a destination of the own vehicle, on a basis of the travel environment data accumulated by the data accumulation unit,
the output data compilation device including
a forward region calculation unit configured to make predictive calculation of a forward region of the own vehicle, using the current state map data, and
a calculation transmission unit configured to transmit, to the own vehicle, a result of the predictive calculation,
the forward region of the vehicle is determined on a basis of at least the current state map data,
the traveling region determined is partitioned into a plurality of divisions in units of at least a predetermined distance, time, or both, and
the forward region calculation unit is configured to update the current state map data before the own vehicle passes through one of the plurality of the divisions, and output, to the own vehicle, simulated sensor data based on the predictive calculation.

12. The traffic control system according to claim 2, wherein
the travel environment data includes map data, regional data, or both, the regional data including data regarding a location of the own vehicle,
the traffic control apparatus further includes an input data compilation device, and an output data compilation device,
the input data compilation device including
a data accumulation unit configured to accumulate the travel environment data, and
a current state map data creation unit configured to create current state map data regarding a path to a destination of the own vehicle, on a basis of the travel environment data accumulated by the data accumulation unit,
the output data compilation device including
a forward region calculation unit configured to make predictive calculation of a forward region of the own vehicle, using the current state map data, and
a calculation transmission unit configured to transmit, to the own vehicle, a result of the predictive calculation,
the forward region of the vehicle is determined on a basis of at least the current state map data,
the traveling region determined is partitioned into a plurality of divisions in units of at least a predetermined distance, time, or both, and
the forward region calculation unit is configured to update the current state map data before the own vehicle passes through one of the plurality of the divisions, and output, to the own vehicle, simulated sensor data based on the predictive calculation.

13. The traffic control system according to claim 11, wherein
the predictive calculation is made on at least spatial coordinates,
the spatial coordinates include at least plane coordinates, and
the simulated sensor data includes at least the spatial coordinates and azimuth angle data.

14. The traffic control system according to claim 12, wherein
the predictive calculation is made on at least spatial coordinates,
the spatial coordinates include at least plane coordinates, and
the simulated sensor data includes at least the spatial coordinates and azimuth angle data.

15. The traffic control system according to claim 11, wherein
the forward region calculation unit is provided in the own vehicle instead of the traffic control apparatus.

16. The traffic control system according to claim 13, wherein
the forward region calculation unit is provided in the own vehicle instead of the traffic control apparatus.

17. The traffic control system according to claim 1, wherein
the vehicle control apparatus further includes an autonomous sensor, the autonomous sensor being configured to detect data regarding movement of the own vehicle, driver-related data and vehicle-specific data regarding the own vehicle, and peripheral data or regional data regarding the own vehicle, and
the travel environment data transmission unit is configured to transmit, to the traffic control apparatus available for communication in a predetermined area, a predetermined section, or both of a location of the own vehicle, current or previous detection data by the autonomous sensor, the current or previous detection data forming the travel environment data.

18. A traffic control system, comprising
a vehicle control apparatus configured to transmit travel environment data regarding an own vehicle; and
a traffic control apparatus configured to receive the travel environment data from the vehicle control apparatus of each of a plurality of vehicles, and transmit, to each of the plurality of the vehicles, traffic environment data based on the travel environment data received,
the vehicle control apparatus including first circuitry configured to
transmit the travel environment data to the traffic control apparatus, the travel environment data including travel data and appearance data regarding the own vehicle, and detection data regarding exterior environment around the own vehicle, the detection data including appearance data regarding a surrounding vehicle, and
control travel of the own vehicle on a basis of the traffic environment data received from the traffic control apparatus, the travel environment data regarding the own vehicle, or both,
the traffic control apparatus including second circuitry configured to
determine whether or not data regarding a communication-disrupted vehicle out of the plurality of the vehicles is supplementable on a basis of the travel environment data received from a nearby vehicle traveling near the communication-disrupted vehicle, the communication-disrupted vehicle having disruption of communication, and
generate, on a condition that the second circuitry determines that the data regarding the communication-disrupted vehicle is supplementable, the traffic environment data supplemented with the data regarding the communication-disrupted vehicle, on the basis of the travel environment data received from the nearby vehicle, and transmit the traffic environment data generated, to the nearby vehicle.

\* \* \* \* \*